United States Patent
Merrill et al.

(10) Patent No.: US 6,256,146 B1
(45) Date of Patent: Jul. 3, 2001

(54) POST-FORMING CONTINUOUS/DISPERSE PHASE OPTICAL BODIES

(75) Inventors: William W. Merrill, White Bear Lake; Richard C. Allen, Lilydale; Peter D. Condo, Lake Elmo; Olester Benson, Jr., Woodbury, all of MN (US)

(73) Assignee: 3M Innovative Properties, St. Paul, MN (US)

( * ) Notice: Subject to any disclaimer, the term of this patent is extended or adjusted under 35 U.S.C. 154(b) by 0 days.

(21) Appl. No.: 09/127,314

(22) Filed: Jul. 31, 1998

(51) Int. Cl.[7] .............................. G02B 5/30; G02B 27/28
(52) U.S. Cl. .................. 359/500; 359/599; 359/900; 359/494; 359/492; 252/585; 264/1.34; 264/1.9; 264/2.7; 427/163.1
(58) Field of Search .................................... 359/487, 488, 359/490, 492, 494, 495, 500, 599, 900; 252/585; 264/1.31, 1.34, 1.7, 1.9, 2.7, 288.4, 290.2; 427/163.1

(56) References Cited

U.S. PATENT DOCUMENTS

| 2,123,901 | * | 7/1938 | Land | 359/500 |
| 2,123,902 | * | 7/1938 | Land | 359/500 |

(List continued on next page.)

FOREIGN PATENT DOCUMENTS

| 59105 | 9/1993 | (EP) . | |
| 592284 | 9/1993 | (EP) . | |
| 6-41335 | 2/1994 | (JP) . | |
| WO 95/27919 | 4/1995 | (WO) | G02B/27/28 |
| WO 95/17303 | 6/1995 | (WO) | B32B/7/02 |
| WO 95/17691 | 6/1995 | (WO) | G02B/5/30 |
| WO 95/17692 | 6/1995 | (WO) | G02B/5/30 |
| WO 95/17699 | 6/1995 | (WO) | G02F/1/1335 |
| WO 96/18691 | 6/1996 | (WO) . | |
| WO 96/19347 | 6/1996 | (WO) | B32B/7/02 |
| WO 97/01440 | 1/1997 | (WO) | B32B/27/36 |
| WO 97/01774 | 1/1997 | (WO) | G02B/1/10 |
| WO 97/32226 | 9/1997 | (WO) | G02B/5/30 |

OTHER PUBLICATIONS

Kirk Othmer Encyclopedia of Chemical Technology,, vol. 8, pp. 652–664 (4th Ed. 1993).

Aphonin, Optical Properties of Stretched Polymer Dispersed Liquid Crystal Films: angle–dependent Polarized Light Scattering, Liquid Crystals, 1995, vol. 19, No. 4, 469–480.

Dourry, D. and Favis, B.D., Co–Continuity and Phase Inversion in HDPE/PS Blends: The Role of Interfacial Modification, 1995 Annual Technical Conference of Society of Plastics Engineers ANTEC, vol. 53, No. 2, 2001–2009.

Klempner, D. and Berkowski, L., Interpenetrating Polymer Networks, Encyclopedia of Polymer Science and Engineering, 2nd Ed., vol. 9, 489–492.

Leclar, A. and Favis, B.D., The role of interfacial contact in immiscilbe binary polyemr blends and its influence on mechanical properties, Polymer, vol. 37, No. 21, 4723–4728, 1996.

Mekhilef, N.,Favis, D.B., and Carreau, P.J., Morphological Stability of Polystyrene Polyethylene Blends, 1995 Annual Technical conference of the Society of Plastics Engineers ANTEC, vol. 53, No. 2, 1572–1579.

(List continued on next page.)

*Primary Examiner*—Ricky D. Shafer
(74) *Attorney, Agent, or Firm*—Robert J. Pechman

(57) ABSTRACT

Diffusely reflective articles manufactured from optical bodies including continuous and disperse phases are disclosed along with methods of manufacturing such articles. Also disclosed are underdrawn continuous/disperse phase optical bodies that are particularly well-suited to post-forming operations. The articles, methods and optical bodies of the present invention preferably allow for post-forming of the optical bodies while retaining desired levels of diffuse reflectivity in the articles formed from the optical bodies.

36 Claims, 8 Drawing Sheets

U.S. PATENT DOCUMENTS

| | | | | |
|---|---|---|---|---|
| 2,158,130 | * | 5/1939 | Land | 359/492 |
| 2,356,251 | * | 8/1944 | Land | 359/492 |
| 2,604,817 | * | 7/1952 | Schupp, Jr. . | |
| 2,803,552 | | 8/1957 | Stedman . | |
| 3,022,178 | | 8/1962 | Park et al. . | |
| 3,075,228 | | 1/1963 | Elias . | |
| 3,124,639 | | 3/1964 | Kahn | 88/65 |
| 3,212,909 | | 10/1965 | Leigh . | |
| 3,464,601 | | 9/1969 | Christensen . | |
| 3,610,729 | | 10/1971 | Rogers | 350/157 |
| 3,711,176 | | 1/1973 | Alfrey, Jr. et al. | 350/1 |
| 3,819,522 | | 6/1974 | Zmoda . | |
| 3,860,036 | | 1/1975 | Newman, Jr. | 138/45 |
| 3,897,356 | | 7/1975 | Pocilvyko . | |
| 4,080,046 | | 3/1978 | Nishizaki . | |
| 4,249,011 | | 2/1981 | Wendling . | |
| 4,281,084 | | 7/1981 | Fellmann et al. . | |
| 4,446,305 | | 5/1984 | Rogers et al. | 528/348 |
| 4,478,909 | | 10/1984 | Taniguchi et al. . | |
| 4,520,189 | | 5/1985 | Rogers et al. | 528/331 |
| 4,521,588 | | 6/1985 | Rogers et al. | 528/363 |
| 4,525,413 | | 6/1985 | Rogers et al. | 428/212 |
| 4,688,900 | | 8/1987 | Doane et al. . | |
| 4,720,426 | | 1/1988 | Englert et al. | 428/344 |
| 4,871,784 | | 10/1989 | Otonari et al. | 521/138 |
| 5,154,765 | | 10/1992 | Armanini . | |
| 5,188,760 | | 2/1993 | Hikmet et al. | 252/299.01 |
| 5,211,878 | | 5/1993 | Reiffenrath et al. | 252/299.63 |
| 5,217,794 | | 6/1993 | Schrenk | 428/220 |
| 5,235,443 | | 8/1993 | Barnik et al. | 359/37 |
| 5,268,225 | | 12/1993 | Isayev . | |
| 5,269,995 | | 12/1993 | Ramanathan et al. | 264/171 |
| 5,294,657 | | 3/1994 | Melendy et al. | 524/270 |
| 5,301,041 | | 4/1994 | Noda et al. . | |
| 5,301,046 | | 4/1994 | Konuma et al. | 359/51 |
| 5,316,703 | * | 5/1994 | Schrenk . | |
| 5,319,478 | | 6/1994 | Fijnfschilling et al. | 359/53 |
| 5,389,324 | | 2/1995 | Lewis et al. | 264/171 |
| 5,448,404 | | 9/1995 | Schrenk et al. | 359/584 |
| 5,486,935 | | 1/1996 | Kalmanash | 359/37 |
| 5,486,949 | | 1/1996 | Schrenk et al. | 359/498 |
| 5,612,820 | | 3/1997 | Schrenk et al. | 359/498 |
| 5,629,055 | | 5/1997 | Revol et al. | 428/1 |
| 5,686,979 | | 11/1997 | Weber et al. | 349/96 |
| 5,699,188 | | 12/1997 | Gilbert et al. | 359/584 |
| 5,721,603 | | 2/1998 | De Vaan et al. | 349/194 |
| 5,744,534 | | 4/1998 | Ishiharada et al. | 524/442 |
| 5,751,388 | * | 5/1998 | Larson | 359/494 |
| 5,759,467 | | 6/1998 | Carter et al. | 264/173.12 |
| 5,767,935 | | 6/1998 | Ueda et al. | 349/112 |
| 5,770,306 | | 6/1998 | Suzuki et al. | 428/328 |
| 5,783,120 | * | 7/1998 | Ouderkirk et al. . | |
| 5,793,456 | | 8/1998 | Broer et al. | 349/98 |
| 5,808,794 | | 9/1998 | Weber et al. | 359/487 |
| 5,825,542 | | 10/1998 | Cobb, Jr. et al. | 359/487 |
| 5,825,543 | * | 10/1998 | Ouderkirk et al. | 359/500 |
| 5,867,316 | * | 2/1999 | Carlson et al. | 359/492 |

OTHER PUBLICATIONS

Schrenk et al., Nanolayer polymeric optical films, Tappi Journal, pp. 169–174, Jun. 1992.

Sperling, L.H., Chapter I "IInterpenetrating Polymer Networks: An Overview", Interpenetrating Polymer Networks, edited by D. Klempner, L.H. Sperling and L.A. Utracki, Advances in Chemistry Series #239, 3–38, 1994.

Sperling, L.H., Microphase Structure, Encyclopedia of Polymer Science and Engineering.

Sperling, L.H. and Mishra, V., Current Status of Interpenetrating Polymer Networks, Polymers for Advanced Technologies, vol. 7, No. 4, 197–208, Apr. 1996.

Tsi, H.Y. and Min, K., Reactive Blends of Functionalized Polystyrene and Polyethylene Terephthalate, 1995 Annual Technical Conference of the Society of Plastics Engineering ANTEC, vol. 53, No. 2, 1858–1865.

* cited by examiner

POST-FORMING CONTINUOUS/DISPERSE PHASE OPTICAL BODIES

The present invention relates to post-forming of optical bodies containing structures suitable for controlling optical characteristics, such as reflectance and transmission.

BACKGROUND

Optical films are known to the art which are constructed from inclusions dispersed within a continuous matrix. The characteristics of these inclusions can be manipulated to provide a range of reflective and transmissive properties to the film. These characteristics include inclusion size with respect to wavelength within the film, inclusion shape and alignment, inclusion volumetric fill factor and the degree of refractive index mismatch with the continuous matrix along the film's three orthogonal axes.

Other films, such as those disclosed in U.S. Pat. No. 4,688,900 (Doane et. al.), include a clear light-transmitting continuous polymer matrix, with droplets of light modulating liquid crystals dispersed within. Stretching of the material reportedly results in a distortion of the liquid crystal droplet from a spherical to an ellipsoidal shape, with the long axis of the ellipsoid parallel to the direction of stretch. U.S. Pat. No. 5,301,041 (Konuma et al.) make a similar disclosure, but achieve the distortion of the liquid crystal droplet through the application of pressure. A. Aphonin, "Optical Properties of Stretched Polymer Dispersed Liquid Crystal Films: Angle-Dependent Polarized Light Scattering, *Liquid Crystals*, Vol. 19, No. 4, 469–480 (1995), discusses the optical properties of stretched films consisting of liquid crystal droplets disposed within a polymer matrix. He reports that the elongation of the droplets into an ellipsoidal shape, with their long axes parallel to the stretch direction, imparts an oriented birefringence (refractive index difference among the dimensional axes of the droplet) to the droplets, resulting in a relative refractive index mismatch between the dispersed and continuous phases along certain film axes, and a relative index match along the other film axes. Such liquid crystal droplets are not small as compared to visible wavelengths in the film, and thus the optical properties of such films have a substantial diffuse component to their reflective and transmissive properties. Aphonin suggests the use of these materials as a polarizing diffuser for backlit twisted nematic LCD's. However, optical films employing liquid crystals as the disperse phase are substantially limited in the degree of refractive index mismatch between the matrix phase and the dispersed phase. Furthermore, the birefringence of the liquid crystal component of such films is typically sensitive to temperature.

U.S. Pat. No. 5,268,225 (Isayev) discloses a composite laminate made from thermotropic liquid crystal polymer blends. The blend consists of two liquid crystal polymers which are immiscible with each other. The blends may be cast into a film consisting of a dispersed inclusion phase and a continuous phase. When the film is stretched, the dispersed phase forms a series of fibers whose axes are aligned in the direction of stretch. While the film is described as having improved mechanical properties, no mention is made of the optical properties of the film. However, due to their liquid crystal nature, films of this type would suffer from the infirmities of other liquid crystal materials discussed above.

Other optical films have been made by incorporating a dispersion of inclusions of a first polymer into a second polymer, and then stretching the resulting composite in one or two directions. U.S. Pat. No. 4,871,784 (Otonari et al.) is one example of this technology. The polymers are selected such that there is low adhesion between the dispersed phase and the surrounding matrix polymer, so that an elliptical void is formed around each inclusion when the film is stretched. Such voids have dimensions of the order of visible wavelengths. The refractive index mismatch between the void and the polymer in these "microvoided" films is typically quite large (about 0.5), causing substantial diffuse reflection. However, the optical properties of microvoided materials are difficult to control because of variations of the geometry of the interfaces, and it is not possible to produce a film axis for which refractive indices are relatively matched, as would be useful for polarization-sensitive optical properties. Furthermore, the voids in such material can be easily collapsed through exposure to heat and pressure.

There thus remains a need in the art for methods of manufacturing diffusely reflective articles from an optical body including a continuous and a dispersed phase, wherein the refractive index mismatch between the two phases along the material's three dimensional axes can be conveniently and permanently manipulated to achieve desirable degrees of diffuse and specular reflection and transmission, wherein the optical material is stable with respect to stress, strain, temperature differences, and electric and magnetic fields, and wherein the optical material has an insignificant level of iridescence. All of these characteristics are also preferably met by the post-formed articles manufactured from the optical bodies.

SUMMARY OF THE INVENTION

The present invention provides diffusely reflective articles manufactured from optical bodies including continuous and disperse phases, methods of manufacturing such articles, and optical bodies including continuous and disperse phases that are particularly well-suited to post-forming operations. The articles, methods and optical bodies of the present invention allow for post-forming of the optical bodies while retaining the desired diffuse reflectivity in the articles formed from the optical bodies.

Because optical bodies including continuous and disperse phases rely on refractive index differentials developed at least in part by drawing, post-forming of the optical bodies may pose a number of problems. The additional strain caused during the post-forming processes can affect the refractive index differentials between the continuous and disperse phases in the optical bodies, thereby affecting the optical properties of the optical bodies. For example, an optical body designed to diffusely reflect light of one polarization orientation and transmit light of the orthogonal polarization orientation may be altered during post-forming such that it diffusely reflects light with both polarization orientations. In addition, many post-forming processes involve the use of heat during forming, and that heat may alter the refractive index differentials in many of the optical bodies.

As discussed in more detail below, post-forming of diffusely reflective optical bodies in accordance with the present invention involves additional deformation, typically strain-induced, of the optical bodies while retaining desired levels of diffuse reflectivity in the articles so produced. It is preferred that the diffuse reflectivity of the articles be at least as high as the diffuse reflectivity of the optical bodies used to produce the articles and, in some cases, the diffuse reflectivity of the articles may be improved over the diffuse reflectivity of the optical bodies used to produce them.

As used in connection with the present invention, post-forming may involve additional deformation of an optical body provided in film or sheet form along one or more in-plane axes. The optical body being post-formed will preferably have some desired level of diffuse reflectivity for light of at least one polarization orientation before post-forming, and after post-forming the post-formed article will preferably exhibit diffuse reflectivity for light of at least one polarization that is at least as high as the optical body used to manufacture the article. Because the deformation caused during post-forming is along in-plane axes, the resulting post-formed article will also be a sheet or film form. Furthermore, the post-forming may produce a film or sheet article that has increased diffuse reflectivity as compare to the diffuse reflectivity of the optical body used to produce the article.

The additional deformation along the in-plane axes may be uniform over the optical body or it may be non-uniform, i.e., the deformation may be higher in selected areas of the optical body. As a result, the diffusely reflective article may exhibit non-uniform diffuse reflectivity. In other words, the article may include selected areas in which the diffuse reflectivity is higher than in the optical body used to produce the articles.

The post-forming processes of the present invention may result in thinning of the optical bodies. This thinning may be uniform or it may be non-uniform, i.e., selected areas of the optical body may be deformed such that they thin more than other areas of the optical body. It will be understood that the thickness of the optical bodies and the articles produced by post-forming them will be measured along a third axis that is mutually orthogonal to the in-plane axes of the optical body and/or the article. Because the articles may have a non-planar shape, the in-plane axes will be understood as being the local in-plane axes at a given point on the article or optical body. In those cases where the article was substantially thinned during post-forming, the article may include selected areas in which the diffuse reflectivity is lower than in portions that were not deformed.

In some instances, the present invention may include diffusely reflective articles and methods of manufacturing the articles in which the optical bodies are deformed during post-forming to produce diffusely reflective articles including an optical body having at least one surface that forms a self-supporting three-dimensional shape. As used in connection with the present invention, a "self-supporting shape" is a shape that, in the absence of external forces other than gravity retains its shape. In contrast, a flexible film that conforms to a surface on which it is lying is not self-supporting. A "three-dimensional shape" is a shape that is located in three-dimensions in space or is formed in three mutually orthogonal dimensions, i.e., the surface having the shape is non-planar. As a result, a "self-supporting three-dimensional shape" is a shape that, in the absence of external forces, occupies or is formed in three mutually orthogonal directions. Examples of self-supporting three dimensional shapes are discussed below in connection with the illustrative embodiments as well as the examples.

In one aspect, the present invention provides a method of manufacturing a diffusely reflective article by providing an optical body having a generally sheet-like configuration, the optical body including a first phase having a birefringence of at least about 0.05; and a second phase, disposed within the first phase, whose index of refraction differs from the first phase by greater than about 0.05 along a first axis and by less than about 0.05 along a second axis orthogonal to the first axis; wherein diffuse reflectivity of the first and second phases taken together along at least one axis for at least one polarization of electromagnetic radiation is at least about 30%; and post-forming the optical body into a diffusely reflective article, wherein a selected area of the optical body undergoes permanent deformation.

In another aspect, the present invention provides a method of manufacturing a diffusely reflective article by providing an optical body having a generally sheet-like configuration, the optical body including a first phase having a birefringence of at least about 0.05; and a second phase, disposed within the first phase, whose index of refraction differs from the first phase by greater than about 0.05 along a first axis; wherein diffuse reflectivity of the first and second phases taken together along at least one axis for at least one polarization of electromagnetic radiation is at least about 30%; post-forming the optical body into a diffusely reflective article, wherein a selected area of the optical body undergoes permanent deformation, and further wherein the index of refraction of the second phase differs from the index of refraction of the first phase by less than about 0.05 along a second axis orthogonal to the first axis in the selected area of the optical body after post-forming.

In another aspect, the present invention provides a method of manufacturing a diffusely reflective article by providing an optical body having a generally sheet-like configuration, the optical body a first phase having a birefringence of at least about 0.05; and a second phase, disposed within the first phase, whose index of refraction differs from the first phase by greater than about 0.05 along a first axis; wherein diffuse reflectivity of the first and second phases taken together along at least one axis for at least one polarization of electromagnetic radiation is at least about 10% (more preferably at least about 30%); post-forming the optical body into a diffusely reflective article, wherein a selected area of the optical body undergoes permanent deformation; and annealing the optical body after post-forming; wherein the index of refraction of the second phase differs from the index of refraction of the first phase by less than about 0.05 along a second axis orthogonal to the first axis in the selected area of the optical body after annealing.

In another aspect, the present invention provides a method of manufacturing a diffusely reflective article by providing an optical body having a generally sheet-like configuration, the optical body including a first phase having a birefringence of at least about 0.05; a second phase, disposed within the first phase, whose index of refraction differs from the first phase by greater than about 0.05 along a first axis; and a dichroic dye; wherein diffuse reflectivity of the first and second phases taken together along at least one axis for at least one polarization of electromagnetic radiation is at least about 10%; and post-forming the optical body into a diffusely reflective article, wherein a selected area of the optical body undergoes permanent deformation.

In another aspect, the present invention provides a diffusely reflective article including an optical body with a first phase having a birefringence of at least about 0.05 and a second phase, disposed within the first phase, whose index of refraction differs from the first phase by greater than about 0.05 along a first axis and by less than about 0.05 along a second axis orthogonal to the first axis, wherein diffuse reflectivity of the first and second phases taken together along at least one axis for at least one polarization of electromagnetic radiation is at least about 30%; wherein at least one surface of the optical body comprises a self-supporting three-dimensional shape.

In another aspect, the present invention provides a diffusely reflective article including an optical body with a first phase having a birefringence of at least about 0.05 and a second phase, disposed within the first phase, whose index of refraction differs from the first phase by greater than about 0.05 along a first axis and by less than about 0.05 along a second axis orthogonal to the first axis, wherein diffuse reflectivity of the first and second phases taken together along at least one axis for at least one polarization of electromagnetic radiation is at least about 30%; and further wherein the thickness of the optical body as measured along a third axis orthogonal to the first and second axes varies over the optical body.

These and other features and advantages of the present invention are described below.

DETAILED DESCRIPTION OF ILLUSTRATIVE EMBODIMENTS OF THE INVENTION

Figure 1:
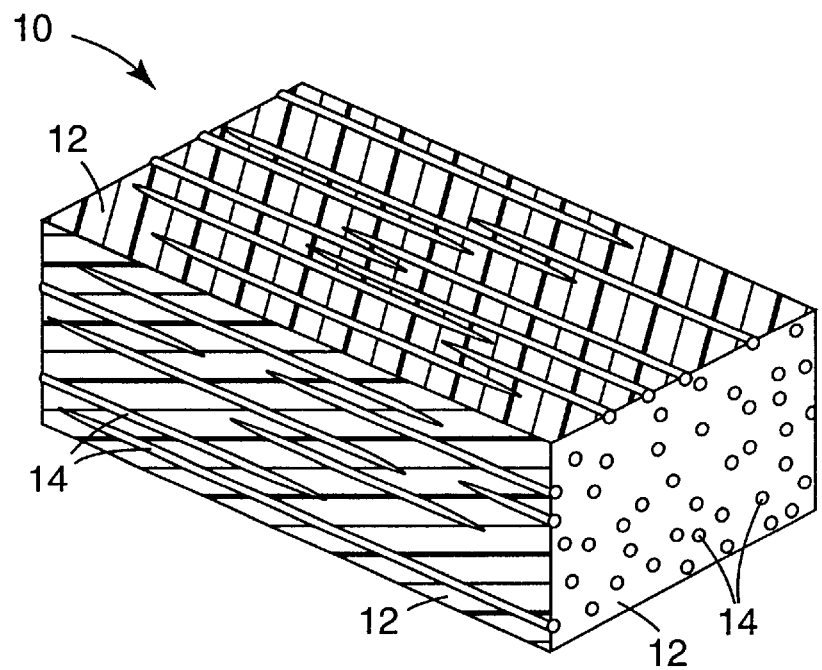
FIG. 1 is a schematic drawing illustrating an optical body that can be used in connection with the present invention, wherein the disperse phase is arranged as a series of elongated masses having an essentially circular cross-section.

The present invention provides diffusely reflective articles manufactured from optical bodies including continuous and disperse phases, methods of manufacturing such articles, and optical bodies including continuous and disperse phases that are particularly well-suited to post-forming operations. The articles, methods and optical bodies of the present invention allow for post-forming of optical bodies while retaining the desired optical properties of the optical bodies.

Post-forming of such optical bodies presents problems because most, if not all, post-forming processes result in deformation of the optical bodies from their manufactured state. Those deformations can adversely affect the optical and mechanical properties of the optical bodies.

While the present invention is frequently described herein with reference to the visible region of the spectrum, various embodiments of the present invention can be used to operate at different wavelengths (and thus frequencies) of electromagnetic radiation. For simplicity, the term "light" will be used herein to refer to any electromagnetic radiation (regardless of the wavelength/frequency of the electromagnetic radiation) capable of being reflected by the optical films of the present invention. For example, the optical films may be capable of reflecting very high, ultrahigh, microwave and millimeter wave frequencies of electromagnetic radiation. More preferably, the term "light" will refer to electromagnetic radiation including the ultraviolet through the infrared spectrum (including the visible spectrum). Even more preferably, "light" as used in connection with the present invention can be defined as electromagnetic radiation in the visible spectrum.

Furthermore, many of the optical bodies and processes of post-forming optical bodies according to the present invention rely on strain-induced index of refraction differentials between the continuous and disperse phases in the bodies. Where they are discussed, the values used are determined using light having a wavelength of 632.8 nanometers.

Although much of the discussion below focuses on optical films, it should be understood that the films thus described are only one subset of the optical bodies of the present invention. For example, the optical bodies may also be provided in sheet form as well as in film form.

As used herein, the terms "specular reflection" and "specular reflectance" refer to the reflectance of light rays into an emergent cone with a vertex angle of 16 degrees centered about the specular angle. The terms "diffuse reflection" or "diffuse reflectance" refer to the reflection of rays that are outside the specular cone defined above. The terms "total reflectance" or "total reflection" refer to the combined reflectance of all light from a surface. Thus, total reflection is the sum of specular and diffuse reflection.

Similarly, the terms "specular transmission" and "specular transmittance" are used herein in reference to the transmission of rays into an emergent cone with a vertex angle of 16 degrees centered about the specular direction. The terms "diffuse transmission" and "diffuse transmittance" are used herein in reference to the transmission of all rays that are outside the specular cone defined above. The terms "total transmission" or "total transmittance" refer to the combined transmission of all light through an optical body. Thus, total transmission is the sum of specular and diffuse transmission.

Optical Bodies

All of the optical bodies, as that term is used in connection with the present invention, exhibit at least partial diffuse reflectivity of a substantial portion of incident light of at least one polarization orientation. As desired, the optical bodies may also transmit light having an orthogonal polarization orientation or, alternatively, the optical bodies may also diffusely reflect a substantial portion of light having an orthogonal polarization orientation. Where transmitted, the light may be specularly transmitted or it may be diffusely transmitted. As such, the optical bodies used in connection with the present invention may be used as diffusely reflective polarizers reflecting light of one polarization. Alternatively, the optical bodies may function as at least partially diffusely reflective mirrors, reflecting light of both polarization orientations. In yet another embodiment, the optical bodies may function as at least partially specularly reflective mirrors.

Except where dyes or colorants are intentionally added, it is further preferred that the optical bodies exhibit low or minimal absorption losses. As a result, substantially all of the light that is not transmitted is reflected.

Many optical bodies useful in connection with the present invention and methods of manufacturing them are described in U.S. patent application Ser. Nos. 08/610,092; 08/609,753; 08/610,109; 08/610,110 (all filed on Feb. 29, 1996); Ser. No. 08/801,329 (filed Feb. 18, 1997); Ser. Nos. 08/807,262; 08/807,268; 08/807,270; 08/807,930 (all filed on Feb. 28, 1997); and Ser. No. 09/006,455 (filed Jan. 13, 1998); as well as in U.S. Pat. No. 5,751,388 (Larson) and various other patents, patent applications, articles, and other documents referred to herein.

Generally, however, in the optical bodies of the present invention, the reflection and transmission properties for at least two orthogonal polarizations of incident light are determined by the selection or manipulation of various parameters, including the optical indices of the continuous and disperse phases, the size and shape of the disperse phase particles, the volume fraction of the disperse phase, the thickness of the optical body through which some fraction of the incident light is to pass, and the wavelength or wavelength band of electromagnetic radiation of interest.

Figure 2:
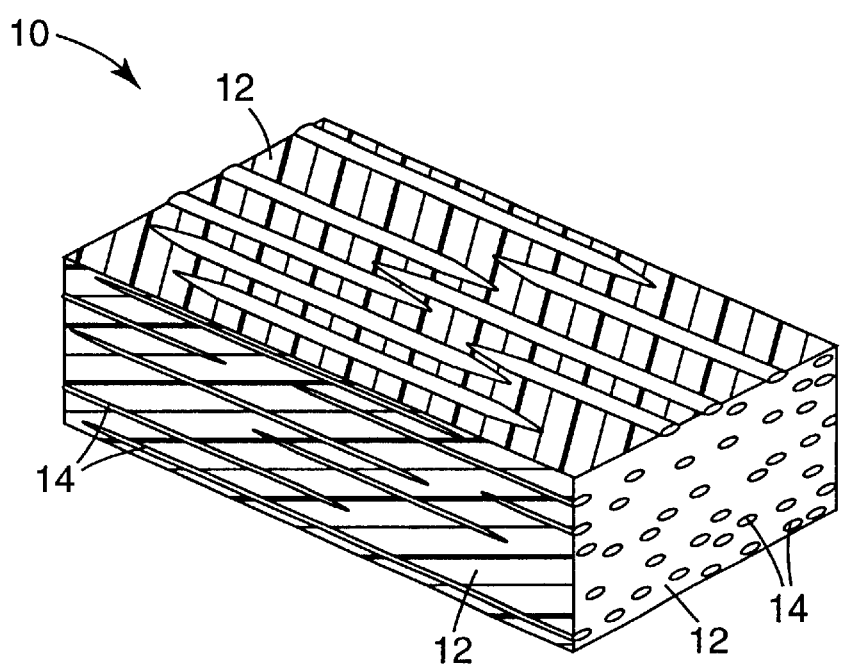
FIG. 2 is a schematic drawing illustrating an optical body that can be used in connection with the present invention, wherein the disperse phase is arranged as a series of elongated masses having an essentially elliptical cross-section.

FIGS. 1–2 illustrate a first embodiment of the optical bodies useful in connection with the present invention. A diffusely reflective optical film 10 or other optical body is produced which consists of a birefringent matrix or continuous phase 12 and a discontinuous or disperse phase 14. The birefringence of the continuous phase is typically at least about 0.05, preferably at least about 0.1, more preferably at least about 0.15, and most preferably at least about 0.2.

The indices of refraction of the continuous and disperse phases may also be substantially matched (i.e., differ by less than about 0.05) along a first of three mutually orthogonal axes, and are substantially mismatched (i.e., differ by more than about 0.05) along a second of three mutually orthogonal axes. Preferably, the indices of refraction of the continuous and disperse phases differ by less than about 0.03 in the match direction, more preferably, less than about 0.02, and most preferably, less than about 0.01. The indices of refraction of the continuous and disperse phases preferably differ in the mismatch direction by at least about 0.05, more preferably at least about 0.07, even more preferably by at least about 0.1, and most preferably by at least about 0.2.

The mismatch in refractive indices along a particular axis has the effect that incident light polarized along that axis will be substantially scattered, resulting in a significant amount of reflection. By contrast, incident light polarized along an axis in which the refractive indices are matched will be spectrally transmitted or reflected with a much lesser degree of scattering. This effect can be utilized to make a variety of optical devices, including reflective polarizers and mirrors.

The patent applications cited above describe practical and simple optical bodies and methods for making optical bodies including different phases. They also provide discussions regarding obtaining a continuous range of optical properties according to the principles described therein. Also, very efficient low loss polarizers can be obtained with high extinction ratios. Other advantages are a wide range of practical materials for the disperse phase and the continuous phase, and a high degree of control in providing optical bodies of consistent and predictable high quality performance.

Effect of Index Match/Mismatch

In one preferred embodiment, the materials of at least one of the continuous and disperse phases are of a type that undergoes a change in refractive index upon orientation. Consequently, as the body is oriented in one or more directions during manufacturing, refractive index matches or mismatches are produced along one or more axes. By careful manipulation of orientation parameters and other processing conditions, the positive or negative birefringence of the matrix can be used to induce diffuse reflection or transmission of one or both polarizations of light along a given axis. The relative ratio between transmission and diffuse reflection is dependent on the concentration of the disperse phase inclusions, the thickness of the body, the square of the difference in the index of refraction between the continuous and disperse phases, the size and geometry of the disperse phase inclusions, and the wavelength or wavelength band of the incident radiation.

The magnitude of the index match or mismatch along a particular axis directly affects the degree of scattering of light polarized along that axis. In general, scattering power varies as the square of the index mismatch. Thus, the larger the index mismatch along a particular axis, the stronger the scattering of light polarized along that axis. Conversely, when the mismatch along a particular axis is small, light polarized along that axis is scattered to a lesser extent and is thereby substantially transmitted specularly through the volume of the body.

If the index of refraction of the inclusions (i.e., the disperse phase) matches that of the continuous host media along some axis, then incident light polarized with electric fields parallel to this axis will be substantially specularly transmitted (unscattered) through the optical body, regardless of the size, shape, and density of inclusions. If the indices are not matched along some axis, then the inclusions will scatter light polarized along this axis. For scatterers of a given cross-sectional area with dimensions larger than approximately $\lambda/30$ (where $\lambda$ is the wavelength of light in the media), the strength of the scattering is largely determined by the index mismatch. The exact size, shape and alignment of a mismatched inclusion play a role in determining how much light will be scattered into various directions from that inclusion. If the density and thickness of the scattering layer is sufficient, according to multiple scattering theory, incident light will be either reflected or absorbed, but not transmitted, regardless of the details of the scatterer size and shape.

When the material is to be used as a polarizer, it is preferably processed, as by stretching and allowing some dimensional relaxation in the cross stretch in-plane direction, so that the index of refraction difference between the continuous and disperse phases is large along a first axis in a plane parallel to a surface of the material and small along the other two orthogonal axes. This results in a large optical anisotropy for electromagnetic radiation of different polarizations.

Some of the polarizers within the scope of the present invention are elliptical polarizers. In general, elliptical polarizers will have a difference in index of refraction between the disperse phase and the continuous phase for both the stretch and cross-stretch directions. The ratio of forward to back scattering is dependent on the difference in refractive index between the disperse and continuous phases, the concentration of the disperse phase, the size and shape of the disperse phase, and the overall thickness of the body. In general, elliptical diffusers have a relatively small difference in index of refraction between the particles of the disperse phase and the continuous phase. By using a birefringent polymer-based diffuser, highly elliptical polarization sensitivity (i.e., diffuse reflectivity depending on the polarization of light) can be achieved. At an extreme, where the index of refraction of the polymers match on one axis, the elliptical polarizer will be a diffuse reflecting polarizer.

Methods of Obtaining Index Match/Mismatch

The materials selected for use in an optical body designed to function as a reflective polarizer in accordance with the present invention, and the degree of orientation of these materials, are preferably chosen so that the phases in the finished optical body have at least one axis for which the associated indices of refraction are substantially equal. The match of refractive indices associated with that axis results in substantially no reflection of light in that plane of polarization.

The disperse phase may also exhibit a change in the refractive index associated with the direction of orientation after stretching. It is preferred that the disperse phase exhibit a decrease in the refractive index after stretching. If the birefringence of the host is positive, a negative strain induced birefringence of the disperse phase has the advantage of increasing the difference between indices of refraction of the adjoining phases associated with the orientation axis while the reflection of light with its plane of polarization perpendicular to the orientation direction is still negligible. For an optically polarizing body, differences between the indices of refraction of adjoining phases in the direction orthogonal to the orientation direction should be less than about 0.05 after orientation, and preferably, less than about 0.02, and more preferably, less than about 0.01.

The disperse phase may also exhibit a positive strain induced birefringence. However, this can be altered by means of heat treatment to match the refractive index of the axis perpendicular to the orientation direction of the continuous phase. The temperature of the heat treatment should not be so high as to relax the birefringence in the continuous phase.

It should be understood that the continuous phase may exhibit a negative strain induced birefringence. For this case, it is preferred that the disperse phase exhibit an increase in the refractive index after stretching.

Underdrawn Optical Bodies

In connection with the present invention, a class of optical bodies that will be referred to herein as "underdrawn" optical bodies may be advantageously provided for post-forming. Typically, the optical bodies that are not underdrawn will be drawn or stretched during manufacturing to relatively high limits so as to achieve relatively high refractive index mismatches between the different phases in the optical body. Such optical bodies may be referred to as "fully-drawn" optical bodies. As described above, it is preferred that the index of refraction differential between phases in the mismatch direction for typical fully-drawn optical bodies be at least about 0.05 and the index of refraction differential in the match direction (for a reflective polarizer) is typically less than about 0.05, preferably less than about 0.03, more preferably less than about 0.02, and most preferably less than about 0.01.

In contrast, underdrawn optical bodies according to the present invention will be purposely drawn to a limited degree. One of the benefits of an underdrawn optical body as compared to a fully-drawn optical body of the same general composition is the extensibility of the underdrawn optical body. Given a fully-drawn optical body and an underdrawn optical body of the same general composition, the fully-drawn film will typically fail (through fracture, hole formation, etc.) when subjected to a large enough stretch or draw ratio during post-forming. In comparison, the underdrawn optical body will typically be capable of exceeding the post-forming draw ratios at which the fully-drawn optical body fails—and do so without failing. In some cases, it may be possible to stretch the underdrawn, yet still oriented, optical body in a post-forming step by a factor of at least about 1.5:1, and, in some cases, by a factor of at least about 2:1.

For the case of reflective polarizers, it may be possible to characterize underdrawn optical bodies in terms of their index of refraction differentials. For example, an underdrawn optical body including a first phase and second phase dispersed within the first phase may typically exhibit a refractive index differential in the match direction (for a reflective polarizer) of more than about 0.01, preferably, more than about 0.02, more preferably, more than about 0.03, and most preferably, more than about 0.05. The underdrawn optical body may exhibit a diffuse reflectivity of the first and second phases taken together along at least one axis for light of at least one polarization of at least about 30%.

Such an underdrawn optical body can typically be manufactured by reducing the draw or stretch to which the cast optical body is subjected during manufacturing by an appropriate amount given the materials in the optical body and the process conditions.

Although the underdrawn reflective polarizer optical body exhibits a refractive index differential in the match direction that is higher than that typically preferred in a fully-drawn reflective polarizer optical body, post-forming of the underdrawn optical body may be advantageously used to reduce the refractive index differential in the match direction. In some preferred post-forming processes, the refractive index differentials in the match direction after post-forming are the same as those found in fully drawn optical bodies, i.e., less than about 0.05, more preferably less than about 0.03, more preferably less than about 0.02, and most preferably less than about 0.01.

In some other preferred post-forming processes, the refractive index differentials in the selected areas in the match direction after post-forming are greater than those found in fully drawn optical bodies, i.e., more than about 0.01, preferably, more than about 0.02, more preferably, more than about 0.03, and most preferably, more than about 0.05. In this preferred embodiment, the selected post-formed areas may lose the ability to substantially transmit one polarization of light.

The refractive index differentials in the match direction may also be altered by heat or annealing operations following the post-forming steps. Such annealing steps can be performed on post-formed bodies irrespective of whether the starting material was underdrawn or fully-drawn.

In the case of an optical body functioning as a diffusely reflective mirror, it may be desirable to provide an underdrawn optical body in which the refractive index differentials in two orthogonal mismatch directions can be increased by post-forming.

Size of Disperse Phase

The size of the disperse phase also can have a significant effect on scattering. If the disperse phase particles are too small (i.e., less than about 1/30 the wavelength of light in the medium of interest) and if there are many particles per cubic wavelength, the optical body behaves as a medium with an effective index of refraction somewhat between the indices of the two phases along any given axis. In such a case, very little light is scattered. If the particles are too large, the light is specularly reflected from the surface of the particle, with very little diffusion into other directions. When the particles are too large in at least two orthogonal directions, undesirable iridescence effects can also occur. Practical limits may also be reached when particles become large in that the thickness of the optical body becomes greater and desirable mechanical properties are compromised.

The dimensions of the particles of the disperse phase after alignment can vary depending on the desired use of the optical material. Thus, for example, the dimensions of the particles may vary depending on the wavelength of electromagnetic radiation that is of interest in a particular application, with different dimensions required for reflecting or transmitting visible, ultraviolet, infrared, and microwave radiation. Generally, however, a characteristic dimension of the particles should be such that they are approximately greater than the wavelength of electromagnetic radiation of interest in the medium, divided by 30.

Preferably, in applications where the optical body is to be used as a low loss reflective polarizer, the particles will have a characteristic dimension that is greater than about 2 times the wavelength of the electromagnetic radiation over the wavelength range of interest, and preferably over 4 times the wavelength. The average diameter of the particles is preferably equal or less than the wavelength of the electromagnetic radiation over the wavelength range of interest, and preferably less than 0.5 of the desired wavelength. While the dimensions of the disperse phase are a secondary consideration in most applications, they become of greater importance in thin film applications, where there is comparatively little diffuse reflection.

Geometry of Disperse Phase

While the index mismatch is the predominant factor relied upon to promote scattering in the films of the present invention (i.e., a diffuse mirror or polarizer made in accordance with the present invention has a substantial mismatch in the indices of refraction of the continuous and disperse phases along at least one axis), the geometry of the particles of the disperse phase can have a secondary effect on scattering. Thus, the depolarization factors of the particles for the electric field in the index of refraction match and mismatch directions can reduce or enhance the amount of scattering in a given direction. For example, when the disperse phase is elliptical in a cross-section taken along a plane perpendicular to the axis of orientation, the elliptical cross-sectional shape of the disperse phase contributes to the asymmetric diffusion in both back scattered light and forward scattered light. The effect can either add or detract from the amount of scattering from the index mismatch, but generally has a small influence on scattering in the preferred range of properties in the present invention.

The shape of the disperse phase particles can also influence the degree of diffusion of light scattered from the particles. This shape effect is generally small but increases as the aspect ratio of the geometrical cross-section of the particle in the plane perpendicular to the direction of incidence of the light increases and as the particles get relatively larger. In general, in the operation of this invention, the disperse phase particles should be sized less than several wavelengths of light in one or two mutually orthogonal dimensions if diffuse, rather than specular, reflection is preferred.

Preferably, for a low loss reflective polarizer, the preferred embodiment consists of a disperse phase disposed within the continuous phase as a series of rod-like structures which, as a consequence of orientation, have a high aspect ratio which can enhance reflection for polarizations parallel to the orientation direction by increasing the scattering strength and dispersion for that polarization relative to polarizations perpendicular to the orientation direction. However, the disperse phase may be provided with many different geometries. Thus, the disperse phase may be disk-shaped or elongated disk-shaped, rod-shaped, or spherical. Other embodiments are contemplated wherein the disperse phase has cross sections which are approximately elliptical (including circular), polygonal, irregular, or a combination of one or more of these shapes. The cross-sectional shape and size of the particles of the disperse phase may also vary from one particle to another, or from one region of the film to another (i.e., from the surface to the core).

In some embodiments, the disperse phase may have a core and shell construction, wherein the core and shell are made out of the same or different materials, or wherein the core is hollow. Thus, for example, the disperse phase may consist of hollow fibers of equal or random lengths, and of uniform or non-uniform cross section. The interior space of the fibers may be empty, or may be occupied by a suitable medium which may be a solid, liquid, or gas, and may be organic or inorganic. The refractive index of the medium may be chosen in consideration of the refractive indices of the disperse phase and the continuous phase so as to achieve a desired optical effect (i.e., reflection or polarization along a given axis).

The geometry of the disperse phase may be arrived at through suitable orientation or processing of the optical material, through the use of particles having a particular geometry, or through a combination of the two. Thus, for example, a disperse phase having a substantially rod-like structure can be produced by orienting a film consisting of approximately spherical disperse phase particles along a single axis. The rod-like structures can be given an elliptical cross-section by orienting the film in a second direction perpendicular to the first. As a further example, a disperse phase having a substantially rod-like structure in which the rods are rectangular in cross-section can be produced by orienting in a single direction a film having a disperse phase consisting of a series of essentially rectangular flakes.

Stretching is one convenient manner for arriving at a desired geometry, since stretching can also be used to induce a difference in indices of refraction within the material. As indicated above, the orientation of films in accordance with the invention may be in more than one direction, and may be sequential or simultaneous.

In another example, the components of the continuous and disperse phases may be extruded such that the disperse phase is rod-like in one axis in the unoriented film. Rods with a high aspect ratio may be generated by orienting in the direction of the major axis of the rods in the extruded film. Plate-like structures may be generated by orienting in an orthogonal direction to the major axis of the rods in the extruded film.

The structure in FIG. 2 can be produced by asymmetric biaxial orientation of a blend of essentially spherical particles within a continuous matrix. Alternatively, the structure may be obtained by incorporating a plurality of fibrous structures into the matrix material, aligning the structures along a single axis, and orienting the mixture in a direction transverse to that axis. Still another method for obtaining this structure is by controlling the relative viscosities, shear, or surface tension of the components of a polymer blend so as to give rise to a fibrous disperse phase when the blend is extruded into a film. In general, it is found that the best results are obtained when the shear is applied in the direction of extrusion.

Dimensional Alignment of Disperse Phase

Dimensional alignment is also found to have an effect on the scattering behavior of the disperse phase. In particular, it has been observed in optical bodies made in accordance with the present invention that aligned scatterers will not scatter light symmetrically about the directions of specular transmission or reflection as randomly aligned scatterers would. In particular, inclusions that have been elongated through orientation to resemble rods scatter light primarily along (or near) the surface of a cone centered on the orientation direction and along the specularly transmitted direction. This may result in an anisotropic distribution of scattered light about the specular reflection and specular transmission directions. For example, for light incident on such an elongated rod in a direction perpendicular to the orientation direction, the scattered light appears as a band of light in the plane perpendicular to the orientation direction with an intensity that decreases with increasing angle away from the specular directions. By tailoring the geometry of the inclusions, some control over the distribution of scattered light can be achieved both in the transmissive hemisphere and in the reflective hemisphere.

Dimensions of Disperse Phase

In applications where the optical body is to be used as a low loss reflective polarizer, the structures of the disperse phase preferably have a high aspect ratio, i.e., the structures are substantially larger in one dimension than in any other dimension. The aspect ratio is preferably at least 2, and more preferably at least 5. The largest dimension (i.e., the length) is preferably at least 2 times the wavelength of the electromagnetic radiation over the wavelength range of interest, and more preferably at least 4 times the desired wavelength. On the other hand, the smaller (i.e., cross-sectional) dimensions of the structures of the disperse phase are preferably less than or equal to the wavelength of interest, and more preferably less than 0.5 times the wavelength of interest.

Volume Fraction of Disperse Phase

The volume fraction of the disperse phase also affects the scattering of light in the optical bodies of the present invention. Within certain limits, increasing the volume fraction of the disperse phase tends to increase the amount of scattering that a light ray experiences after entering the body for both the match and mismatch directions of polarized light. This factor is important for controlling the reflection and transmission properties for a given application.

The desired volume fraction of the disperse phase will depend on many factors, including the specific choice of materials for the continuous and disperse phase. However, the volume fraction of the disperse phase will typically be at least about 1% by volume relative to the continuous phase, more preferably within the range of about 5 to about 15%, and most preferably within the range of about 15 to about 30%.

Co-Continuous Phases

When the volume fraction for binary blends of high polymers of roughly equivalent viscosity approaches 50%, the distinction between the disperse and continuous phases becomes difficult, as each phase becomes continuous in space. Depending upon the materials of choice, there may also be regions where the first phase appears to be dispersed within the second, and vice versa. For a description of a variety of co-continuous morphologies and for methods of evaluating, analyzing, and characterizing them, see Sperling and the references cited therein (L. H. Sperling, "Microphase Structure", *Encyclopedia of Polymer Science and Engineering*, 2nd Ed., Vol. 9, 760–788, and L. H. Sperling, Chapter 1 "Interpenetrating Polymer Networks: An Overview", *Interpenetrating Polymer Networks*, edited by D. Klempner, L. H. Sperling, and L. A. Utracki, Advances in Chemistry Series #239, 3–38, 1994).

Materials having co-continuous phases may be made by a number of different methods. For example, the polymeric first phase material may be mechanically blended with the polymeric second phase material to achieve a co-continuous system. Examples of co-continuous morphologies achieved by blending are described, for example, in D. Bourry and B. D. Favis, "Co-Continuity and Phase Inversion in HDPE/PS Blends: The Role of Interfacial Modification", 1995 *Annual Technical Conference of the Society of Plastics Engineers ANTEC*, Vol. 53, No. 2, 2001–2009 (polystyrene/polyethylene blends), and in A. Leclair and B. D. Favis, "The role of interfacial contact in immiscible binary polymer blends and its influence on mechanical properties", *Polymer*, Vol. 37, No. 21, 4723–4728, 1996 (polycarbonate/polyethylene blends).

Co-continuous phases may also be formed by first by dissolving them out of supercritical fluid extractions, such as that disclosed for blends of polystyrene and poly(methyl methacrylate) in U.S. Pat. No. 4,281,084, and then allowing them to phase separate following exposure to heat and/or mechanical shear, as described by in N. Mekhilef, B. D. Favis and P. J. Carreau, "Morphological Stability of Polystyrene Polyethylene Blends", 1995 *Annual Technical Conference of the Society of Plastics Engineers ANTEC*, Vol. 53, No. 2, 1572–1579).

A further method of producing co-continuous phases is through the creation of interpenetrating polymer networks (IPNs). Some of the more important IPNs include simultaneous IPNs, sequential IPNs, gradient IPNs, latex IPNs, thermoplastic IPNs, and semi-IPNs. These and other types of IPNs, their physical properties (e.g., phase diagrams), and methods for their preparation and characterization, are described, for example, in L. H. Sperling and V. Mishra, "Current Status of Interpenetrating Polymer Networks", *Polymers for Advanced Technologies*, Vol. 7, No. 4, 197–208, April 1996, and in L. H. Sperling, "Interpenetrating Polymer Networks: An Overview", *Interpenetrating Polymer Networks*, edited by D. Klempner, L. H. Sperling, and L. A. Utracki, Advances in Chemistry Series #239, 3–38, 1994). Some of the major methods for preparing these systems are summarized below.

Simultaneous IPNs may be made by mixing together the respective monomers or prepolymers, plus the crosslinkers and activators, of two or more polymer networks. The respective monomers or prepolymers are then reacted simultaneously, but in a non-interfering manner. Thus, for example, one reaction may be made to proceed by way of chain polymerization kinetics, and the other reaction may be made to proceed through step polymerization kinetics.

Sequential IPNs are made by first forming an initial polymer network. Then, the monomers, crosslinkers, and activators of one or more additional networks are swollen into the initial polymer network, where they are reacted in situ to yield additional polymer networks.

Gradient IPNs are synthesized in such a manner that the overall composition or crosslink density of the IPN varies macroscopically in the material from one location to another. Such systems may be made, for example, by forming a first polymer network predominantly on one surface of a film and a second polymer network predominantly on another surface of the film, with a gradient in composition throughout the interior of the film.

Latex IPNs are made in the form of latexes (e.g., with a core and shell structure). In some variations, two or more latexes may be mixed and formed into a film, which crosslinks the polymers.

Thermoplastic IPNs are hybrids between polymer blends and IPNs that involve physical crosslinks instead of chemical crosslinks. As a result, these materials can be made to flow at elevated temperatures in a manner similar to that of thermoplastic elastomers, but are crosslinked and behave as IPNs at the temperatures of normal use.

Semi-IPNs are compositions of two or more polymers in which one or more of the polymers are crosslinked and one or more of the polymers are linear or branched.

As indicated above, co-continuity can be achieved in multicomponent systems as well as in binary systems. For example, three or more materials may be used in combination to give desired optical properties (e.g., transmission and reflectivity) and/or improved physical properties. All components may be immiscible, or two or more components may demonstrate miscibility. A number of ternary systems exhibiting co-continuity are described, for example, in L. H. Sperling, Chapter 1 "Interpenetrating Polymer Networks: An Overview", *Interpenetrating Polymer Networks*, edited by D. Klempner, L. H. Sperling, and L. A. Utracki, Advances in Chemistry Series #239, 3–38, 1994).

Characteristic sizes of the phase structures, ranges of volume fraction over which co-continuity may be observed, and stability of the morphology may all be influenced by additives, such as compatibilizers, graft or block copolymers, or reactive components, such as maleic anhydride or glycidyl methacrylate. Such effects are described, for example, for blends of polystyrene and poly(ethylene terephthalate) in H. Y. Tsai and K. Min, "Reactive Blends of Functionalized Polystyrene and Polyethylene Terephthalate", 1995 *Annual Technical Conference of the Society of Plastics Engineers ANTEC*, Vol. 53, No. 2, 1858–1865. However, for particular systems, phase diagrams may be constructed through routine experimentation and used to produce co-continuous systems.

The microscopic structure of co-continuous systems can vary significantly, depending on the method of preparation, the miscibility of the phases, the presence of additives, and other factors as are known to the art. Thus, for example, one or more of the phases in the co-continuous system may be fibrillar, with the fibers either randomly oriented or oriented along a common axis. Other co-continuous systems may comprise an open-celled matrix of a first phase, with a second phase disposed in a co-continuous manner within the cells of the matrix. The phases in these systems may be co-continuous along a single axis, along two axes, or along three axes.

Optical bodies having co-continuous phases (particularly IPNs) will, in several instances, have properties that are advantageous over the properties of similar optical bodies that are made with only a single continuous phase, depending, of course, on the properties of the individual polymers and the method by which they are combined. Thus, for example, the co-continuous systems of the present invention allow for the chemical and physical combination of structurally dissimilar polymers, thereby providing a convenient route by which the properties of the optical body may be modified to meet specific needs. Furthermore, co-continuous systems will frequently be easier to process, and may impart such properties as weatherability, reduced flammability, greater impact resistance and tensile strength, improved flexibility, and superior chemical resistance. IPNs are particularly advantageous in certain applications, since they typically swell (but do not dissolve) in solvents, and exhibit suppressed creep and flow compared to analogous non-IPN systems (see, e.g., D. Klempner and L. Berkowski, "Interpenetrating Polymer Networks", *Encyclopedia of Polymer Science and Engineering*, 2nd Ed., Vol. 9, 489–492. One skilled in the art will appreciate that the principles of co-continuous systems as are known to the art may be applied in light of the teachings set forth in U.S. patent application Ser. No. 08/801,329 (filed Feb. 18, 1997) to produce co-continuous morphologies having unique optical properties. Thus, for example, the refractive indices of known co-continuous morphologies may be manipulated as taught therein to produce new optical films for use in connection with the present invention. Likewise, the principles taught therein may be applied to known optical systems to produce co-continuous morphologies that may also be used in connection with the present invention.

Thickness of Optical Body

The thickness of the optical body may also be an important parameter which can be manipulated to affect reflection and transmission properties in connection with the present invention. As used herein, "thickness" will typically be measured along an axis that is orthogonal to both of two in-plane axes defined by the optical body. In a curved or non-planar optical body, those in-plane axes may be defined by tangents to the optical body at given points on the optical body.

As the thickness of the optical body increases, diffuse reflection also increases, and transmission, both specular and diffuse, decreases. Thus, while the thickness of the optical body will typically be chosen to achieve a desired degree of mechanical strength in the finished product, it can also be used to directly to control reflection and transmission properties.

Thickness can also be utilized to make final adjustments in reflection and transmission properties of the optical body. Thus, for example, in film applications, the device used to extrude the film can be controlled by a downstream optical device which measures transmission and reflection values in the extruded film, and which varies the thickness of the film (i.e., by adjusting extrusion rates or changing casting wheel speeds) so as to maintain the reflection and transmission values within a predetermined range.

The thickness of the optical bodies used in connection with the present invention may also be selected to compensate for thinning effects that may be associated with post-forming.

Materials for Continuous/Disperse Phases

Many different materials may be used as the continuous or disperse phases in the optical bodies of the present invention, depending on the specific application to which the optical body is directed. Such materials include inorganic materials such as silica-based polymers, organic materials such as liquid crystals, and polymeric materials, including monomers, copolymers, grafted polymers, and mixtures or blends thereof. The exact choice of materials for a given application will be driven by the desired match and mismatch obtainable in the refractive indices of the continuous and disperse phases along a particular axis, as well as the desired physical properties in the resulting product. However, the materials of the continuous phase will generally be characterized by being substantially transparent in the region of the spectrum desired.

A further consideration in the choice of materials is that the resulting product must contain at least two distinct phases. This may be accomplished by casting the optical material from two or more materials which are immiscible with each other. Alternatively, if it is desired to make an optical material with a first and second material which are not immiscible with each other, and if the first material has a higher melting point than the second material, in some cases it may be possible to embed particles of appropriate dimensions of the first material within a molten matrix of the second material at a temperature below the melting point of the first material. The resulting mixture can then be cast into a film, with or without subsequent orientation, to produce an optical device.

If the optical bodies are to be used in thermoforming applications, i.e., post-forming processes involving the application of heat to assist in deforming the optical bodies, it may also be desirable that the materials chosen exhibit desirable properties in view of the expected or potential processing temperatures.

Suitable polymeric materials for use as the continuous or disperse phase in the present invention may be amorphous, semicrystalline, or crystalline polymeric materials, including materials made from monomers based on carboxylic acids such as isophthalic, azelaic, adipic, sebacic, dibenzoic, terephthalic, 2,7-naphthalene dicarboxylic, 2,6-naphthalene dicarboxylic, cyclohexanedicarboxylic, and bibenzoic acids (including 4,4'-bibenzoic acid), or materials made from the corresponding esters of the aforementioned acids (i.e., dimethylterephthalate). Of these, 2,6-polyethylene naphthalate (PEN) is especially preferred because of its strain induced birefringence, and because of its ability to remain permanently birefringent after stretching. PEN has a refractive index for polarized incident light of 550 nm wavelength which increases after stretching when the plane of polarization is parallel to the axis of stretch from about 1.64 to as high as about 1.9, while the refractive index decreases for light polarized perpendicular to the axis of stretch. PEN exhibits a birefringence (in this case, the difference between the index of refraction along the stretch direction and the index perpendicular to the stretch direction) of 0.25 to 0.40 in the visible spectrum. The birefringence can be increased by increasing the molecular orientation. PEN may be substantially heat stable from about 155° C. up to about 230° C., depending upon the processing conditions utilized during the manufacture of the film.

Polybutylene naphthalate is also a suitable material as well as other crystalline naphthalene dicarboxylic polyesters. The crystalline naphthalene dicarboxylic polyesters exhibit a difference in refractive indices associated with different in-plane axes of at least 0.05 and preferably above 0.20.

When PEN is used as one phase in the optical material of the present invention, the other phase is preferably polymethylmethacrylate (PMMA) or a syndiotactic vinyl aromatic polymer such as polystyrene (sPS). Other preferred polymers for use with PEN are based on terephthalic, isophthalic, sebacic, azelaic or cyclohexanedicarboxylic acid or the related alkyl esters of these materials. Naphthalene dicarboxylic acid may also be employed in minor amounts to improve adhesion between the phases. The diol component may be ethylene glycol or a related diol. Preferably, the index of refraction of the selected polymer is less than about 1.65, and more preferably, less than about 1.55, although a similar result may be obtainable by using a polymer having a higher index of refraction if the same index difference is achieved.

Syndiotactic-vinyl aromatic polymers useful in the current invention include poly(styrene), poly(alkyl styrene), poly(styrene halide), poly(alkyl styrene), poly(vinyl ester benzoate), and these hydrogenated polymers and mixtures, or copolymers containing these structural units. Examples of poly(alkyl styrenes) include: poly(methyl styrene), poly (ethyl styrene), poly(propyl styrene), poly(butyl styrene), poly(phenyl styrene), poly(vinyl naphthalene), poly (vinylstyrene), and poly(acenaphthalene) may be mentioned. As for the poly(styrene halides), examples include: poly(chlorostyrene), poly(bromostyrene), and poly (fluorostyrene). Examples of poly(alkoxy styrene) include: poly(methoxy styrene), and poly(ethoxy styrene). Among these examples, as particularly preferable styrene group polymers, are: polystyrene, poly(p-methyl styrene), poly(m-methyl styrene), poly(p-tertiary butyl styrene), poly(p-chlorostyrene), poly(m-chloro styrene), poly(p-fluoro styrene), and copolymers of styrene and p-methyl styrene may be mentioned.

Furthermore, as comonomers of syndiotactic vinyl-aromatic group copolymers, besides monomers of above explained styrene group polymer, olefin monomers such as ethylene, propylene, butene, hexene, or octene; diene monomers such as butadiene, isoprene; polar vinyl monomers such as cyclic diene monomer, methyl methacrylate, maleic acid anhydride, or acrylonitrile may be mentioned.

The syndiotactic-vinyl aromatic polymers of the present invention may be block copolymers, random copolymers, or alternating copolymers.

The vinyl aromatic polymer having high level syndiotactic structure referred to in this invention generally includes polystyrene having syndiotacticity of higher than 75% or more, as determined by carbon-13 nuclear magnetic resonance. Preferably, the degree of syndiotacticity is higher than 85% racemic diad, or higher than 30%, or more preferably, higher than 50%, racemic pentad.

In addition, although there are no particular restrictions regarding the molecular weight of this syndiotactic-vinyl aromatic group polymer, preferably, the weight average molecular weight is greater than 10,000 and less than 1,000,000, and more preferably, greater than 50,000 and less than 800,000.

As for the other resins, various types may be mentioned, including, for instance, vinyl aromatic group polymers with atactic structures, vinyl aromatic group polymers with iso-tactic structures, and all polymers that are miscible. For example, polyphenylene ethers show good miscibility with the previous explained vinyl aromatic group polymers. Furthermore, the composition of these miscible resin components is preferably between 70 to 1 weight %, or more preferably, 50 to 2 weight %. When composition of miscible resin component exceeds 70 weight %, degradation on the heat resistance may occur, and is usually not desirable.

It is not required that the selected polymer for a particular phase be a copolyester or copolycarbonate. Vinyl polymers and copolymers made from monomers such as vinyl naphthalenes, styrenes, ethylene, maleic anhydride, acrylates, and methacrylates may also be employed. Condensation polymers, other than polyesters and polycarbonates, can also be utilized. Suitable condensation polymers include polysulfones, polyamides, polyurethanes, polyamic acids, and polyimides. Naphthalene groups and halogens such as chlorine, bromine and iodine are useful in increasing the refractive index of the selected polymer to the desired level (1.59 to 1.69) if needed to substantially match the refractive index if PEN is the host. Acrylate groups and fluorine are particularly useful in decreasing the refractive index.

Minor amounts of comonomers may be substituted into the naphthalene dicarboxylic acid polyester so long as the large refractive index difference in the orientation direction (s) is not substantially compromised. A smaller index difference (and therefore decreased reflectivity) may be counterbalanced by advantages in any of the following: improved adhesion between the continuous and disperse phase, lowered temperature of extrusion, and better match of melt viscosities.

Region of Spectrum

While the optical bodies and the articles formed from them are frequently described herein with reference to the visible region of the spectrum, various embodiments of the present invention can be used to operate at different wavelengths (and thus frequencies) of electromagnetic radiation through appropriate scaling of the components of the optical body. Thus, as the wavelength increases, the linear size of the components of the optical body may be increased so that the dimensions of these components, measured in units of wavelength, remain approximately constant.

Of course, one major effect of changing wavelength is that, for most materials of interest, the index of refraction and the absorption coefficient change. However, the principles of index match and mismatch still apply at each wavelength of interest, and may be utilized in the selection of materials for an optical device that will operate over a specific region of the spectrum. Thus, for example, proper scaling of dimensions will allow operation in the infrared, near-ultraviolet, and ultra-violet regions of the spectrum. In these cases, the indices of refraction refer to the values at these wavelengths of operation, and the body thickness and size of the disperse phase scattering components should also be approximately scaled with wavelength. Even more of the electromagnetic spectrum can be used, including very high, ultrahigh, microwave and millimeter wave frequencies. Polarizing and diffusing effects will be present with proper scaling to wavelength and the indices of refraction can be obtained from the square root of the dielectric function (including real and imaginary parts). Useful products in these longer wavelength bands can be diffuse reflective polarizers and partial polarizers.

In some embodiments of the present invention, the optical properties of the optical body vary across the wavelength band of interest. In these embodiments, materials may be utilized for the continuous and/or disperse phases whose indices of refraction, along one or more axes, varies from one wavelength region to another. The choice of continuous and disperse phase materials, and the optical properties (i.e., diffuse and disperse reflection or specular transmission) resulting from a specific choice of materials, will depend on the wavelength band of interest.

Skin Layers

A layer of material which is substantially free of a disperse phase may be coextensively disposed on one or both major surfaces of the optical body, i.e., the extruded blend of the disperse phase and the continuous phase. Such layers will not be considered to be a part of the optical body of the present invention, which preferably includes different phases as described above.

The composition of such a layer or layers, also called skin layers, may be chosen, for example, to protect the integrity of the disperse phase within the extruded blend, to add mechanical or physical properties to the final optical body or to add optical functionality to the final optical body. Suitable materials of choice may include the material of the continuous phase or the material of the disperse phase. Other materials with a melt viscosity similar to the extruded blend may also be useful.

A skin layer or layers may reduce the wide range of shear intensities the extruded blend forming the optical body might experience within the extrusion process, particularly at the die. A high shear environment may cause undesirable surface voiding and may result in a textured surface. A broad range of shear values throughout the thickness of the optical body may also prevent the disperse phase from forming the desired particle size in the blend of the optical body.

A skin layer or layers may also add physical strength to the resulting composite or reduce problems during processing, such as, for example, reducing the tendency for the optical body to split during the orientation process. Skin layer materials which remain amorphous may tend to make optical bodies with a higher toughness, while skin layer materials which are semicrystalline may tend to make optical bodies with a higher tensile modulus. Other functional components such as antistatic additives, UV absorbers, dyes, antioxidants, and pigments, may be added to the skin layer, provided they do not substantially interfere with the desired optical properties of the resulting product.

Skin layers or coatings may also be added to the major surfaces of the optical bodies to impart desired barrier properties to the resulting optical bodies. Thus, for example, barrier films or coatings may be added as skin layers, or as a component in skin layers, to alter the transmissive properties of the optical body towards liquids, such as water or organic solvents, or gases, such as oxygen or carbon dioxide.

Skin layers or coatings may also be added to impart or improve abrasion resistance in the resulting article. Thus, for example, a skin layer comprising particles of silica embedded in a polymer matrix may be added to an optical body useful in connection with the invention to impart abrasion resistance to the optical body, provided, of course, that such a layer does not unduly compromise the optical properties required for the application to which the optical body is directed.

Skin layers or coatings may also be added to impart or improve puncture and/or tear resistance in the resulting article. Thus, for example, in embodiments in which the outer layer of the optical body contains coPEN as the major phase, a skin layer of monolithic coPEN may be coextruded with the optical layers to impart good tear resistance to the resulting optical body. Factors to be considered in selecting a material for a tear resistant layer include percent elongation to break, Young's modulus, tear strength, adhesion to interior layers, percent transmittance and absorbance in an electromagnetic bandwidth of interest, optical clarity or haze, refractive indices as a function of frequency, texture and roughness, melt thermal stability, molecular weight distribution, melt rheology and coextrudability, miscibility and rate of inter-diffusion between materials in the skin and optical layers, viscoelastic response, relaxation and crystallization behavior under draw conditions, thermal stability at use temperatures, weatherability, ability to adhere to coatings and permeability to various gases and solvents. Puncture or tear resistant skin layers may be applied during the manufacturing process or later coated onto or laminated to the optical body. Adhering these layers to the optical body during the manufacturing process, such as by a coextrusion process, provides the advantage that the optical body is protected during the manufacturing process. In some embodiments, one or more puncture or tear resistant layers may be provided within the optical body, either alone or in combination with a puncture or tear resistant skin layer.

The skin layers may be applied to one or two sides of the extruded blend at some point during the extrusion process, i.e., before the extruded blend and skin layer(s) exit the extrusion die. This may be accomplished using conventional coextrusion technology, which may include using a three-layer coextrusion die. Lamination of skin layer(s) to a previously formed optical body of an extruded blend is also possible. Total skin layer thicknesses may range from about 2% to about 50% of the total blend/skin layer thickness.

In some applications, additional layers may be coextruded or adhered on the outside of the skin layers during manufacture of the optical bodies. Such additional layers may also be extruded or coated onto the optical body in a separate coating operation, or may be laminated to the optical body as a separate film, foil, or rigid or semi-rigid substrate such as polyester (PET), acrylic (PMMA), polycarbonate, metal, or glass.

A wide range of polymers are suitable for skin layers. Of the predominantly amorphous polymers, suitable examples include copolyesters based on one or more of terephthalic acid, 2,6-naphthalene dicarboxylic acid, isophthalic acid phthalic acid, or their alkyl ester counterparts, and alkylene diols, such as ethylene glycol. Examples of semicrystalline polymers suitable for use in skin layers include 2,6-polyethylene naphthalate, polyethylene terephthalate, and nylon materials. Skin layers that may be used to increase the toughness of the optical film include high elongation polyesters such as Ecdel™ and PCTG 5445 (available commercially from Eastman Chemical Co., Rochester, N.Y.) and polycarbonates. Polyolefins, such as polypropylene and polyethylene, may also be used for this purpose, especially if they are made to adhere to the optical film with a compatibilizer.

Functional Layers

Various functional layers or coatings may be added to the optical bodies of the present invention to alter or improve their physical or chemical properties, particularly along the surface of the optical body. Such layers or coatings may include, for example, slip agents, low adhesion backside materials, conductive layers, antistatic coatings or films, barrier layers, flame retardants, UV stabilizers, abrasion resistant materials, optical coatings, or substrates designed to improve the mechanical integrity or strength of the optical body. Examples of some suitable layers or coatings are discussed in U.S. patent application Ser. No. 08/494,416.

The optical bodies used in connection with the present invention may be given good slip properties by treating them with low friction coatings or slip agents, such as polymer beads coated onto the surface. Alternately, the morphology of the surfaces of these materials may be modified, as through manipulation of extrusion conditions, to impart a slippery surface to the optical body; methods by which surface morphology may be so modified are described in U.S. Pat. No. 5,759,467 (issued Jun. 2, 1998).

In some applications, as where the optical bodies of the present invention are to be used in connection with pressure sensitive adhesives, it may be desirable to treat the surfaces of the optical bodies with low adhesion backsize (LAB) coatings or films such as those based on urethane, silicone or fluorocarbon chemistry. Optical bodies treated in this manner may exhibit desirable release properties towards pressure sensitive adhesives (PSA's).

The optical bodies used in connection with the present invention may also be provided with one or more conductive layers. Such conductive layers may comprise metals such as silver, gold, copper, aluminum, chromium, nickel, tin, and titanium, metal alloys such as silver alloys, stainless steel, and inconel, and semiconductor metal oxides such as doped and undoped tin oxides, zinc oxide, and indium tin oxide (ITO).

The optical bodies used in connection with the present invention may also be provided with antistatic coatings or films. Such coatings or films include, for example, $V_2O_5$ and salts of sulfonic acid polymers, carbon or other conductive metal layers.

The optical bodies used in connection with the present invention may also be provided with one or more barrier films or coatings that alter the transmissive properties of the optical body towards certain liquids or gases. Thus, for example, the optical bodies of the present invention may be provided with films or coatings that inhibit the transmission of water vapor, organic solvents, $O_2$, or $CO_2$ through the film. Barrier coatings will be particularly desirable in high humidity environments, where components of the optical film would be subject to distortion due to moisture permeation.

The optical bodies used in connection with the present invention may also be treated with flame retardants, particularly when used in environments, such as on airplanes, that are subject to strict fire codes. Suitable flame retardants include aluminum trihydrate, antimony trioxide, antimony pentoxide, and flame retarding organophosphate compounds.

The optical bodies used in connection with the present invention may also be provided with abrasion-resistant or hard coatings, which will frequently be applied as a skin layer. These include acrylic hardcoats such as Acryloid A-11 and Paraloid K-120N, available from Rohm & Haas, Philadelphia, Pa.; urethane acrylates, such as those described in U.S. Pat. No. 4,249,011 and those available from Sartomer Corp., Westchester, Pa.; and urethane hardcoats obtained from the reaction of an aliphatic polyisocyanate (e.g., Desmodur N-3300, available from Miles, Inc., Pittsburgh, Pa.) with a polyester (e.g., Tone Polyol 0305, available from Union Carbide, Houston, Tex.).

The optical bodies used in connection with the present invention may further be laminated to rigid or semi-rigid substrates, such as those described in U.S. patent application Ser. No. 08/807,270 (filed on Feb. 28, 1997). The substrates chosen may provide structural rigidity, weatherability, thermal stability, easier handling, etc.

The optical bodies used in connection with the present invention may also be provided with shatter resistant films and coatings. Films and coatings suitable for this purpose are described, for example, in publications EP 592284 and EP 591055, and are available commercially from 3M Company, St. Paul, Minn.

Various optical layers, materials, and devices may also be applied to, or used in conjunction with, the optical bodies used in connection with the present invention for specific applications. These include, but are not limited to, magnetic or magneto-optic coatings or films; liquid crystal panels, such as those used in display panels and privacy windows; photographic emulsions; fabrics; prismatic films, such as linear Fresnel lenses; brightness enhancement films; holographic films or images; embossable films; anti-tamper films or coatings; IR transparent film for low emissivity applications; release films or release coated paper; and polarizers or mirrors.

Multiple additional layers on one or both major surfaces of the optical bodies are contemplated, and can be any combination of aforementioned coatings or films. For example, when an adhesive is applied to the optical body, the adhesive may contain a white pigment such as titanium dioxide to increase the overall reflectivity, or it may be optically transparent to allow the reflectivity of the substrate to add to the reflectivity of the optical body.

Furthermore, the various coatings and films may be applied before or after post-forming of the optical bodies into the desired three dimensional articles. For example, it may not be desirable to provide some of the more strain-sensitive coatings or films to the optical body after post-forming to prevent fracture, delamination etc. In other cases, it may be desirable or merely possible to provide the coatings and/or films before post-forming without adversely affecting the coatings and/or films.

To improve roll formation and convertibility of the optical bodies when provided as films, the films used in connection with the present invention may also include a slip agent incorporated into the optical body or added as a separate coating. In some applications, slip agents will be added to only one side of the optical body.

Microvoiding

In some embodiments of optical bodies used in connection with the present invention, the materials of the continuous and disperse phases may be chosen so that the interface between the two phases will be sufficiently weak to result in voiding when the optical body is oriented. The average dimensions of the voids may be controlled through careful manipulation of processing parameters and stretch ratios, or through selective use of compatibilizers. The voids may be back-filled in the finished product with a liquid, gas, or solid. Voiding may be used in conjunction with the aspect ratios and refractive indices of the disperse and continuous phases to produce desirable optical properties in the resulting optical body.

More Than Two Phases

The optical bodies used in connection with the present invention may include more than two phases. Thus, for example, an optical body used in connection with the present invention can include two or more different disperse phases within the continuous phase. The additional disperse phases could be randomly or non-randomly dispersed throughout the continuous phase, and/or they may be randomly aligned or aligned along a common axis.

Optical bodies used in connection with the present invention may also include more than one continuous phase. Thus, in some embodiments, the optical body may include, in addition to a first continuous phase and a disperse phase, a second phase which is co-continuous in at least one dimension with the first continuous phase. In one particular embodiment, the second continuous phase is a porous, sponge-like material which is coextensive with the first continuous phase (i.e., the first continuous phase extends through a network of channels or spaces extending through the second continuous phase, much as water extends through a network of channels in a wet sponge). In a related embodiment, the second continuous phase is in the form of a dendritic structure which is coextensive in at least one dimension with the first continuous phase.

Multilayer Combinations

If desired, one or more sheets of a continuous/disperse phase film made in accordance with the present invention may be used in combination with, or as a component in, a multilayered optical film to provide desirable optical properties. Such combinations could improve reflectivity for light of one or both polarizations. Alternatively, the combination could be used to specularly transmit light of one polarization and diffusely transmit light of the orthogonal polarization, transmitting both polarization orientations with low or minimal absorption.

Suitable multilayered films include those of the type described in WO 95/17303 (Ouderkirk et al.). Because the optical bodies of the present invention are to be deformed in one or more post-forming operations, it may be desirably to employ the techniques of post-forming multilayer optical films and/or the multilayer optical films described in POST-FORMABLE MULTILAYER OPTICAL FILMS AND METHODS OF FORMING, filed on even date herewith. The teachings regarding birefringent materials/layers in that document may be analogous to the birefringent phase or phases in the continuous/disperse phase systems of the optical bodies used in connection with the present invention.

In such a construction, the individual sheets may be coextruded, laminated, or otherwise adhered together, or they may be spaced apart. If the optical thicknesses of the phases within the sheets are substantially equal (that is, if the two sheets present a substantially equal and large number of scatterers to incident light along a given axis), the composite will reflect, at somewhat greater efficiency, substantially the same band width and spectral range of reflectivity (i.e., "band") as the individual sheets. If the optical thicknesses of phases within the sheets are not substantially equal, the composite will reflect across a broader bandwidth than the individual phases. A composite combining mirror sheets with polarizer sheets is useful for increasing total reflectance while still polarizing transmitted light. Alternatively, a single sheet may be biaxially oriented to produce a film having selective reflective and polarizing properties.

Figure 3:
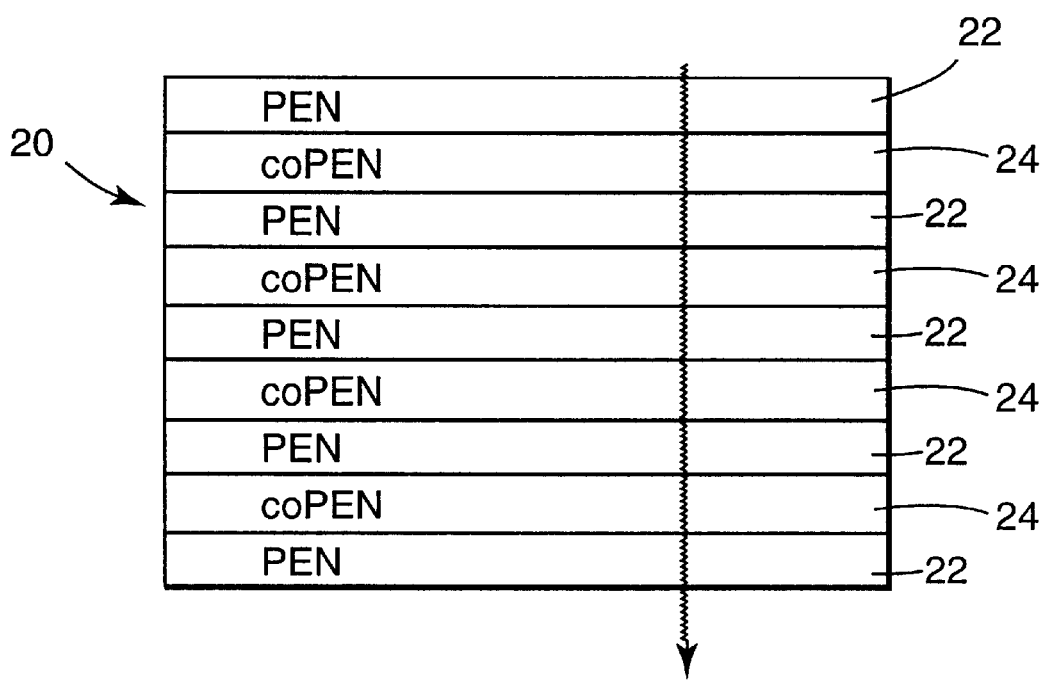
FIG. 3 is a schematic representation of a multilayer film that can be used in connection with the present invention.

FIG. 3 illustrates one example of this embodiment of the present invention. There, the optical body includes a multilayer film 20 in which the layers alternate between layers of PEN 22 and layers of co-PEN 24. Each PEN layer includes a disperse phase of syndiotactic polystyrene (sPS) within a matrix of PEN. This type of construction is desirable in that it promotes lower off-angle color. Furthermore, since the layering or inclusion of scatterers averages out light leakage, control over layer thickness is less critical, allowing the film to be more tolerable of variations in processing parameters.

Any of the materials previously noted may be used as any of the layers in this embodiment, or as the continuous or disperse phase within a particular layer. However, PEN and co-PEN are particularly desirable as the major components of adjacent layers, since these materials promote good laminar adhesion.

Also, a number of variations are possible in the arrangement of the layers. Thus, for example, the layers can be made to follow a repeating sequence through part or all of the structure. One example of this is a construction having the layer pattern . . . ABCABC . . . , wherein A, B, and C are distinct materials or distinct blends or mixtures of the same or different materials, and wherein one or more of A, B, or C contains at least one disperse phase and at least one continuous phase. The skin layers are preferably the same or chemically similar materials as the continuous phase.

Antireflection Layers

The optical bodies used in connection with the present invention may also include one or more anti-reflective layers or coatings, such as, for example, conventional vacuum coated dielectric metal oxide or metal/metal oxide optical films, silica sol gel coatings, and coated or coextruded antireflective layers such as those derived from low index fluoropolymers such as THV, an extrudable fluoropolymer available from 3M Company (St. Paul, Minn.). Such layers or coatings, which may or may not be polarization sensitive, serve to increase transmission and to reduce reflective glare, and may be imparted to the optical bodies used in connection with the present invention through appropriate surface treatment, such as coating or sputter etching. A particular example of an antireflective coating is described in more detail in Examples 132–133 of U.S. patent application Ser. No. 08/807,262.

In some embodiments of the optical bodies used in connection with the present invention, it is desired to maximize the transmission and/or minimize the specular reflection for certain polarizations of light. In these embodiments, the optical body may comprise two or more layers in which at least one layer comprises an anti-reflection system in close contact with a layer providing the continuous and disperse phases. Such an anti-reflection system acts to reduce the specular reflection of the incident light and to increase the amount of incident light that enters the portion of the body comprising the continuous and disperse layers. Such a function can be accomplished by a variety of means well known in the art. Examples are quarter wave anti-reflection layers, two or more layer anti-reflective body, graded index layers, and graded density layers. Such anti-reflection functions can also be used on the transmitted light side of the body to increase transmitted light if desired.

Anti-Fog Layers

The optical bodies used in connection with the present invention may be provided with a film or coating which imparts anti-fogging properties. In some cases, an anti-reflection layer as described above will serve the dual purpose of imparting both anti-reflection and anti-fogging properties to the optical body. Various anti-fogging agents are known to the art which are suitable for use with the present invention. Typically, however, these materials will substances, such as fatty acid esters, which impart hydrophobic properties to the surface of the optical body and which promote the formation of a continuous, less opaque film of water.

Coatings which reduce the tendency for surfaces to "fog" have been reported by several inventors. For example, U.S. Pat. No. 3,212,909 to Leigh discloses the use of ammonium soap, such as alkyl ammonium carboxylates in admixture with a surface active agent which is a sulfated or sulfonated fatty material, to produce a anti-fogging composition. U.S. Pat. No. 3,075,228 to Elias discloses the use of salts of sulfated alkyl aryloxypolyalkoxy alcohol, as well as alkyl-benzene sulfonates, to produce an anti-fogging article useful in cleaning and imparting anti-fogging properties to various surfaces. U.S. Pat. No. 3,819,522 to Zmoda, discloses the use of surfactant combinations comprising derivatives of decyne diol as well as surfactant mixtures which include ethoxylated alkyl sulfates in an anti-fogging window cleaner surfactant mixture. Japanese Patent Kokai No. Hei 6[1994] 41,335 discloses a clouding and drip preventive composition comprising colloidal alumina, colloidal silica and an anionic surfactant. U.S. Pat. No. 4,478,909 (Taniguchi et al) discloses a cured anti-fogging coating film which comprises polyvinyl alcohol, a finely divided silica, and an organic silicon compound, the carbon/silicon weight ratio apparently being important to the film's reported anti-fogging properties. Various surfactants, include fluorine-containing surfactants, may be used to improve the surface smoothness of the coating. Other anti-fog coatings incorporating surfactants are described in U.S. Pat. Nos. 2,803,552; 3,022,178; and 3,897,356. World Patent No. PCT 96/18,691 (Scholtz et al) discloses means by which coatings may impart both anti-fog and anti-reflective properties.

UV Protective Layers

The optical bodies used in connection with the present invention may be protected from UV radiation through the use of UV stabilized films or coatings. Suitable UV stabilized films and coatings include those which incorporate benzotriazoles or hindered amine light stabilizers (HALS) such as Tinuvin™ 292, both of which are available commercially from Ciba Geigy Corp., Hawthorne, N.Y. Other suitable UV stabilized films and coatings include those which contain benzophenones or diphenyl acrylates, available commercially from BASF Corp., Parsippany, N.J. Such films or coatings will be particularly important when the optical bodies of the present invention are used in outdoor applications or in luminaires where the source emits significant light in the UV region of the spectrum.

Surface Treatments

The optical bodies used in connection with the present invention may be subjected to various treatments which modify the surfaces of these materials, or any portion thereof, as by rendering them more conducive to subsequent treatments such as coating, dying, metallizing, or lamination. This may be accomplished through treatment with primers, such as PVDC, PMMA, epoxies, and aziridines, or through physical priming treatments such as corona, flame, plasma, flash lamp, sputter-etching, e-beam treatments, or amorphizing the surface layer to remove crystallinity, such as with a hot can.

Lubricants

Various lubricants may be used during the processing (e.g., extrusion) of the optical bodies used in connection with the present invention as well as during some of the post-forming processes described herein. Suitable lubricants for use in connection with the optical bodies of the present invention include calcium sterate, zinc sterate, copper sterate, cobalt sterate, molybdenum neodocanoate, and ruthenium (III) acetylacetonate.

Antioxidants

Antioxidants useful in connection with the present invention include 4,4'-thiobis-(6-t-butyl-m-cresol), 2,2'-methylenebis-(4-methyl-6-t-butyl-butylphenol), octadecyl-3,5-di-t-butyl-4-hydroxyhydrocinnamate, bis-(2,4-di-t-butylphenyl) pentaerythritol diphosphite, Irganox™ 1093 (1979)(((3,5-bis(1,1-dimethylethyl)-4-hydroxyphenyl) methyl)-dioctadecyl ester phosphonic acid), Irganox™ 1098 (N,N'-1,6-hexanediylbis(3,5-bis(1,1-dimethyl)-4-hydroxy-benzenepropanamide), Naugaard™ 445 (aryl amine), Irganox™ L 57 (alkylated diphenylamine), Irganox™ L 115 (sulfur containing bisphenol), Irganox™ LO 6 (alkylated phenyl-delta-napthylamine), Ethanox 398 (flourophosphonite), and 2,2'-ethylidenebis(4,6-di-t-butylphenyl)fluorophosnite.

A group of antioxidants that are especially preferred are sterically hindered phenols, including butylated hydroxytoluene (BHT), Vitamin E (di-alpha-tocopherol), Irganox™ 1425WL(calcium bis-(O-ethyl(3,5-di-t-butyl-4-hydroxybenzyl))phosphonate), Irganox™ 1010 (tetrakis (methylene(3,5,di-t-butyl-4-hydroxyhydrocinnamate)) methane), Irganox™ 1076 (octadecyl 3,5-di-tert-butyl-4-hydroxyhydrocinnamate), Ethanox™ 702 (hindered bis phenolic), Etanox 330 (high molecular weight hindered phenolic), and Ethanox™ 703 (hindered phenolic amine).

Dyes, Pigments, Inks, and Imaging Layers

The optical bodies used in connection with the present invention may be treated with inks, dyes, or pigments to alter their appearance or to customize them for specific applications. Thus, for example, the bodies may be treated with inks or other printed indicia such as those used to display product identification, advertisements, warnings, decoration, or other information. Various techniques can be used to print on the bodies, such as screenprinting, letterpress, offset, flexographic printing, stipple printing, laser printing, and so forth, and various types of ink can be used, including one and two component inks, oxidatively drying and UV-drying inks, dissolved inks, dispersed inks, and 100% ink systems.

The appearance of the optical body may also be altered by coloring the body, such as by laminating a dyed film to the optical body, applying a pigmented coating to the surface of the optical body, or including a pigment in one or more of the materials (e.g., the continuous or disperse phase) used to make the optical body.

Both visible and near IR dyes and pigments are contemplated for use in connection with the optical bodies of the present invention, and include, for example, optical brighteners such as dyes that absorb in the UV and fluoresce in the visible region of the color spectrum. Other additional layers that may be added to alter the appearance of the optical body include, for example, opacifying (black) layers, diffusing layers, holographic images or holographic diffusers, and metal layers. Each of these may be applied directly to one or both surfaces of the optical body, or may be a component of a second film or foil construction that is laminated to the optical body. Alternately, some components such as opacifying or diffusing agents, or colored pigments, may be included in an adhesive layer which is used to laminate the optical body to another surface.

The optical bodies used in connection with the present invention may also be provided with metal coatings. Thus, for example, a metallic layer may be applied directly to the optical film by pyrolysis, powder coating, vapor deposition, cathode sputtering, ion plating, and the like. Metal foils or rigid metal plates may also be laminated to the optical body, or separate polymeric films or glass or plastic sheets may be first metallized using the aforementioned techniques and then laminated to the optical bodies used in connection with the present invention.

Dichroic dyes are a particularly useful additive for many of the applications to which the optical bodies and article manufactured from them are directed, due to their ability to absorb light of a particular polarization when they are molecularly aligned within the material. When used in a film or other material which predominantly scatters only one polarization of light, the dichroic dye causes the material to absorb one polarization of light more than another. Suitable dichroic dyes for use in the present invention include Congo Red (sodium diphenyl-bis-α-naphthylamine sulfonate), methylene blue, stilbene dye (Color Index (CI)=620), and 1,1'-diethyl-2,2'-cyanine chloride (CI=374 (orange) or CI=518 (blue)). The properties of these dyes, and methods of making them, are described in E. H. Land, Colloid Chemistry (1946). These dyes have noticeable dichroism in polyvinyl alcohol and a lesser dichroism in cellulose. A slight dichroism is observed with Congo Red in PEN.

Other suitable dyes include the following materials:

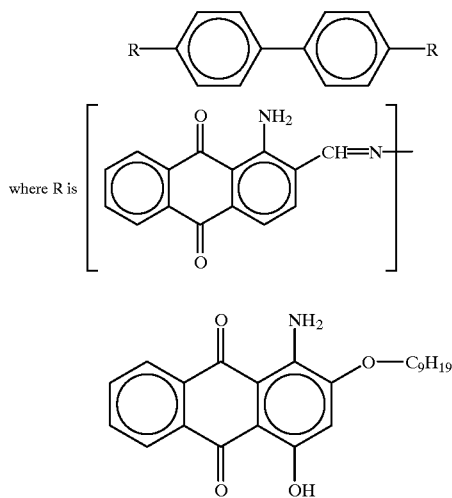

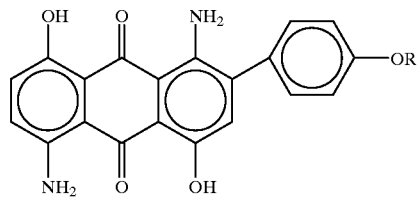

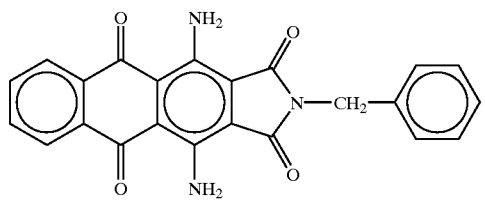

The properties of these dyes, and methods of making them, are discussed in the Kirk Othmer Encyclopedia of Chemical Technology, Vol. 8, pp. 652–661 (4th Ed. 1993), and in the references cited therein.

When a dichroic dye is used in the optical bodies of the present invention, it may be incorporated into either the continuous or disperse phase.

Dichroic dyes in combination with certain polymer systems exhibit the ability to polarize light to varying degrees. Polyvinyl alcohol and certain dichroic dyes may be used to make films with the ability to polarize light. Other polymers, such as polyethylene terephthalate or polyamides, such as nylon-6, do not exhibit as strong an ability to polarize light when combined with a dichroic dye. The polyvinyl alcohol and dichroic dye combination is said to have a higher dichroism ratio than, for example, the same dye in other film forming polymer systems. A higher dichroism ratio indicates a higher ability to polarize light.

Molecular alignment of a dichroic dye within an optical body made in accordance with the present invention is preferably accomplished by stretching the optical body after the dye has been incorporated into it. However, other methods may also be used to achieve molecular alignment. Thus, in one method, the dichroic dye is crystallized, as through sublimation or by crystallization from solution, into a series of elongated notches that are cut, etched, or otherwise formed in the surface of a film or other optical body, either before or after the optical body has been oriented. The treated surface may then be coated with one or more surface layers, may be incorporated into a polymer matrix or used in a multilayer structure, or may be utilized as a component of another optical body. The notches may be created in accordance with a predetermined pattern or diagram, and with a predetermined amount of spacing between the notches, so as to achieve desirable optical properties.

In a related embodiment, the dichroic dye may be disposed within one or more hollow fibers or other conduits, either before or after the hollow fibers or conduits are disposed within the optical body. The hollow fibers or conduits may be constructed out of a material that is the same or different from the surrounding material of the optical body.

In yet another embodiment, the dichroic dye is disposed along the layer interface of a multilayer construction, as by sublimation onto the surface of a layer before it is incorporated into the multilayer construction. In still other embodiments, the dichroic dye is used to at least partially backfill the voids in a microvoided optical body used in connection with the present invention.

Adhesives

Adhesives may be used to laminate the optical bodies used in connection with the present invention to another body, film, surface, or substrate. Such adhesives include both optically clear and diffuse adhesives, as well as pressure sensitive and non-pressure sensitive adhesives. Pressure sensitive adhesives are normally tacky at room temperature and can be adhered to a surface by application of, at most, light finger pressure, while non-pressure sensitive adhesives include solvent, heat, or radiation activated adhesive systems. Examples of adhesives useful in the present invention include those based on general compositions of polyacrylate; polyvinyl ether; diene-containing rubbers such as natural rubber, polyisoprene, and polyisobutylene; polychloroprene; butyl rubber; butadiene-acrylonitrile polymers; thermoplastic elastomers; block copolymers such as styrene-isoprene and styrene-isoprene-styrene block copolymers, ethylene-propylene-diene polymers, and styrene-butadiene polymers; polyalphaolefins; amorphous polyolefins; silicone; ethylene-containing copolymers such as ethylene vinyl acetate, ethylacrylate, and ethylmethacrylate; polyurethanes; polyamides; polyesters; epoxies; polyvinylpyrrolidone and vinylpyrrolidone copolymers; and mixtures of the above.

Additionally, the adhesives can contain additives such as tackifiers, plasticizers, fillers, antioxidants, stabilizers, pigments, diffusing particles, curatives, and solvents. When a laminating adhesive is used to adhere an optical film of the present invention to another surface, the adhesive composition and thickness are preferably selected so as not to interfere with the optical properties of the optical film. For example, when laminating additional layers to an optical polarizer or mirror wherein a high degree of transmission is desired, the laminating adhesive should be optically clear in the wavelength region that the polarizer or mirror is designed to be transparent in.

Other Additives

In addition to the films, coatings, and additives noted above, the optical bodies used in connection with the present invention may also include other materials or additives as are known to the art. Such materials include binders, coatings, fillers, compatibilizers, surfactants, antimicrobial agents, foaming agents, reinforcers, heat stabilizers, impact modifiers, plasticizers, viscosity modifiers, and other such materials.

Post-formed Diffusely Reflective Articles and Methods of Manufacture

The present invention relates to the post-forming of optical bodies to manufacture diffusely reflective articles, the diffusely reflective articles including post-formed optical bodies, and underdrawn optical bodies that are well-suited to post-forming.

As used in connection with the present invention, post-forming can include a variety of processes designed to produce diffusely reflective articles having a variety of shapes. Preferred manufacturing processes used to produce the optical bodies that are post-formed according to the present invention typically involve casting, extruding, or otherwise forming the optical bodies into a film or a sheet, followed by stretching the optical body in one direction for a uniaxially stretched optical body exhibiting some desired level of diffuse reflectivity for light of at least one polarization orientation. If the optical body is to be biaxially stretched, it is typically stretched in both the longitudinal (i.e., machine) direction and in the cross-web direction although any two directions may be used (preferably two generally perpendicular directions). Both uniaxially and biaxially stretched optical bodies are manufactured as generally smooth, planar bodies with caliper or thickness variations of about ±5% or less as manufactured.

The resulting optical bodies may be provided as diffusely reflective polarizers (reflecting light of one polarization orientation and, preferably, transmitting light with the orthogonal polarization orientation. Alternatively, the optical bodies may be provided as diffusely reflective mirrors (reflecting light of two orthogonal polarization orientations).

The optical characteristics provided in the post-formed diffusely reflective articles manufactured according to the present invention can, in some cases, be quantified based on birefringence of one or more of the phases, in-plane index of refraction differentials, reflectivity/transmissivity of the optical bodies to light before and after post-forming, and combinations of some or all of these properties. A number of these combinations are described specifically below with respect to at least portions of the optical body. The portions of the optical bodies referred to may include only those selected areas that undergo permanent deformation as a result of post-forming, only those areas that do not experience permanent deformation, or both areas that undergo permanent deformation and areas that do not experience permanent deformation as a result of post-forming.

In one aspect, it may be desirable to begin the post-forming process with a diffusely reflective optical body including a first phase that is birefringent. The optical body will, before post-forming, exhibit some level of diffuse reflectivity for light of at least one polarization orientation based on an index of refraction differential between phases along an axis. During post-forming, a selected area of the optical body undergoes permanent deformation. For example, it may be desirable that the first phase exhibits a birefringence of at least about 0.05 and that the optical body include a second phase whose index of refraction differs from the index of refraction of the first phase by greater than about 0.05 along a first axis.

In that optical body, it may be further preferred that, in the selected area of the optical body, the diffuse reflectivity of the first and second phases taken together along at least one axis for at least one polarization of light is at least about 30% after post-forming. It may be even more preferred that the diffuse reflectivity of the first and second phases taken together along the at least one axis for the at least one polarization of light increase after post-forming. For example, that reflectivity may preferably increase to 50% or higher after post-forming.

In another aspect, it may be preferred that, in a selected area of the optical body, the first and second phases taken together exhibit a diffuse reflectivity of the at least one axis of at least about 50% for light of both polarizations before and after post-forming.

In still another aspect, it may be preferred that the optical body function as a reflective polarizer, wherein the selected area of the optical body exhibits total reflectivity of greater than about 50% for light of a first polarization and a total transmission of greater than about 50% for light of a second polarization orientation before and/or after post-forming. It may be more preferred that the total reflectivity of the optical body be greater than about 60% for light of the first polarization orientation, and even more preferably greater than about 70%. Furthermore, it may be preferred that, after post-forming, the total transmission of the selected area of the optical body be greater than about 60% for light of the second polarization orientation (where the selected area of the optical body exhibits total reflection of greater than about 50% for light of the first polarization).

In the more specific case of a reflective polarizer, it may be desirable to begin the post-forming process with a diffusely reflective polarizing optical body including a first phase that is birefringent. The optical body will, before post-forming, exhibit some level of diffuse reflectivity for light of at least one polarization orientation based on an index of refraction differential between phases along an axis. During post-forming, a selected area of the optical body undergoes permanent deformation. For example, it may be desirable that the first phase exhibits a birefringence of at least about 0.05 and that the optical body include a second phase whose index of refraction differs from the index of refraction of the first phase by greater than about 0.05 along a first axis. It may further be desired that the index of refraction of the second phase differs from the index of refraction of the first phase by less than about 0.05 along a second axis that is orthogonal to the first axis.

In that diffusely reflecting polarizer, it may be further preferred that, in the selected area of the optical body, the diffuse reflectivity of the first and second phases taken together along at least one axis for at least one polarization of light is at least about 30% after post-forming. It may be even more preferred that the diffuse reflectivity of the first and second phases taken together along the at least one axis for the at least one polarization of light increase after post-forming. For example, that reflectivity may preferably increase to 50% or higher after post-forming.

In another aspect, it may be preferred that a selected area of the diffusely reflective polarizing optical body exhibit a total reflectivity of greater than about 50% for light of a first polarization and a total transmission of greater than about 50% for light of a second polarization orientation after post-forming. It may be more preferred that the total reflectivity of the optical body be greater than about 60% for light of the first polarization orientation, and even more preferably greater than about 70%. Furthermore, it may be preferred that, after post-forming, the total transmission of a selected area of the optical body be greater than about 60% for light of the second polarization orientation (where the selected area of the optical body exhibits total reflection of greater than about 50% for light of the first polarization).

Post-forming, as discussed with respect to the present invention, involves further processing or shaping of the optical bodies to obtain some permanent deformation in the optical body. The deformation may involve further stretching along an in-plane direction, it may result in thinning of the optical body from its manufactured thickness, and/or it may involve deforming at least one surface of the optical body from the uniformly smooth-surfaced shape in which it is manufactured.

Post-forming may also include embossing in which the optical body is deformed under pressure to produce a change in the optical properties of the film. Embossing that provides a textured surface to a skin layer without significantly affecting the optical properties of the optical body within the multilayer optical film is not considered post-forming within the meaning of that term as used herein.

It may be helpful to further describe post-forming in terms of the amount of draw induced in the optical body. In general, post-forming can involve a texturing of the optical body, shallow drawing of the optical body, and deep drawing of the optical body. In the cases where the post-forming involves texturing and/or shallow drawing, it may be possible to use both fully drawn and underdrawn optical bodies to perform the methods because the draw ratios to be experienced may be relatively small. When performing deep draws, however, it may be advantageous to use underdrawn optical bodies because of their increased extensibility as compared to fully-drawn optical bodies. Some exemplary post-forming processes and the articles manufactured thereby are presented below.

One approach to characterizing post-forming deformation of the optical body in accordance with the present invention is depicted in FIGS. 4 and 4A–4C. The optical body 40 includes a first major side 44 and a second major side 46 (see FIG. 4A). Also illustrated are selected areas 42 in which the optical body 40 has been deformed. The selected areas 42 are depicted as being substantially uniform in size and arranged in regular, repeating pattern. It will however, be understood that the selected areas 42 may be non-uniform and/or provided in pattern that irregular/non-repeating.

Figure 4:
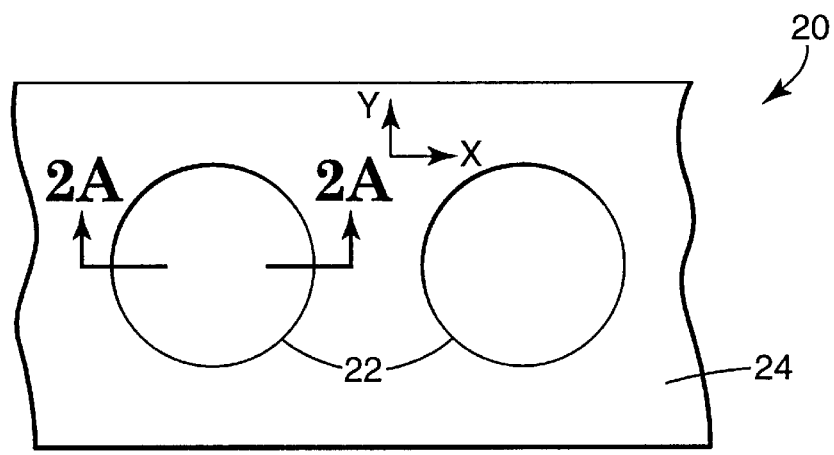
FIG. 4 is a plan view of a portion of one post-formed optical body according to the present invention including selected areas deformed along two in-plane directions.
Figure 4A:
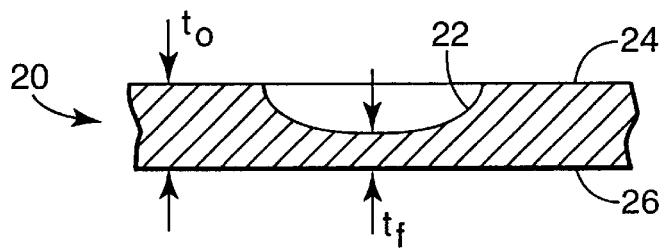
FIG. 4A is an enlarged partial cross-sectional view of the post-formed optical body of FIG. 4 taken along line 4A—4A.

One of the selected areas 42 and the surrounding optical body 40 is seen in the enlarged, partial cross-sectional view of FIG. 4A. The result of the post-forming is that the thickness of the optical body 40 varies. One of the ways in which that variation can manifest itself is that each of the selected areas 42 can form a depression in the otherwise generally smooth first major side 44 of the optical body 40. This post-forming may be considered as an example of texturing, i.e., causing deformations in one surface 44 of the optical body 40 that do not necessarily find any corresponding deformation on the opposite surface 46 of the optical body 40. Texturing does, however, differ from embossing of skin layers in that the optical body 40 (including different phases) itself is deformed.

Figure 4B:
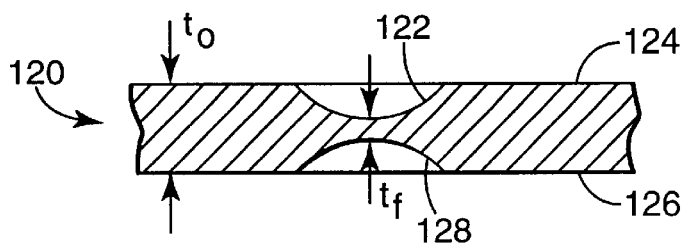
FIGS. 4B and 4C are enlarged partial cross-sectional views of alternative post-formed optical bodies deformed along two in-plane directions.

Another manifestation of the thickness variations in an optical body 140 is illustrated in FIG. 4B where both the first and second major sides 144 and 146 are deformed in selected areas 142 and 148. Like selected area 142 on the first major side 144, selected area 148 on the second major side 146 is also formed as a depression in the otherwise generally smooth second major side 146.

Figure 4C:
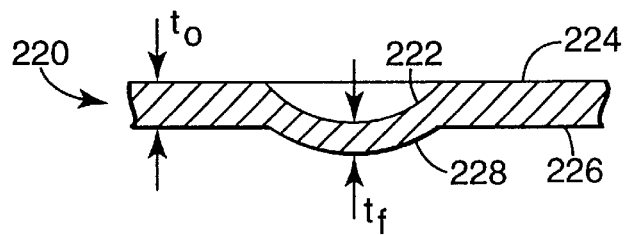

Yet another manifestation of the thickness variations in an optical body 240 is illustrated in FIG. 4C where both the first and second major sides 244 and 246 are deformed in selected areas 242 and 248. While selected areas 242 are formed as depressions on the first major side 244, the selected area 247 on the second major side 246 is formed as a raised area extending outwards from the otherwise generally smooth second major side 246. As depicted, it may be preferred that the raised area 247 on the second major side 246 be located opposite the depressed area 242 on the first major side 244.

The post-forming result depicted in FIG. 4C can be considered one example of a shallow draw, i.e., deformation of the optical body 240 that extends through both opposing surfaces 244 and 246 of the optical body 240.

Figure 5:
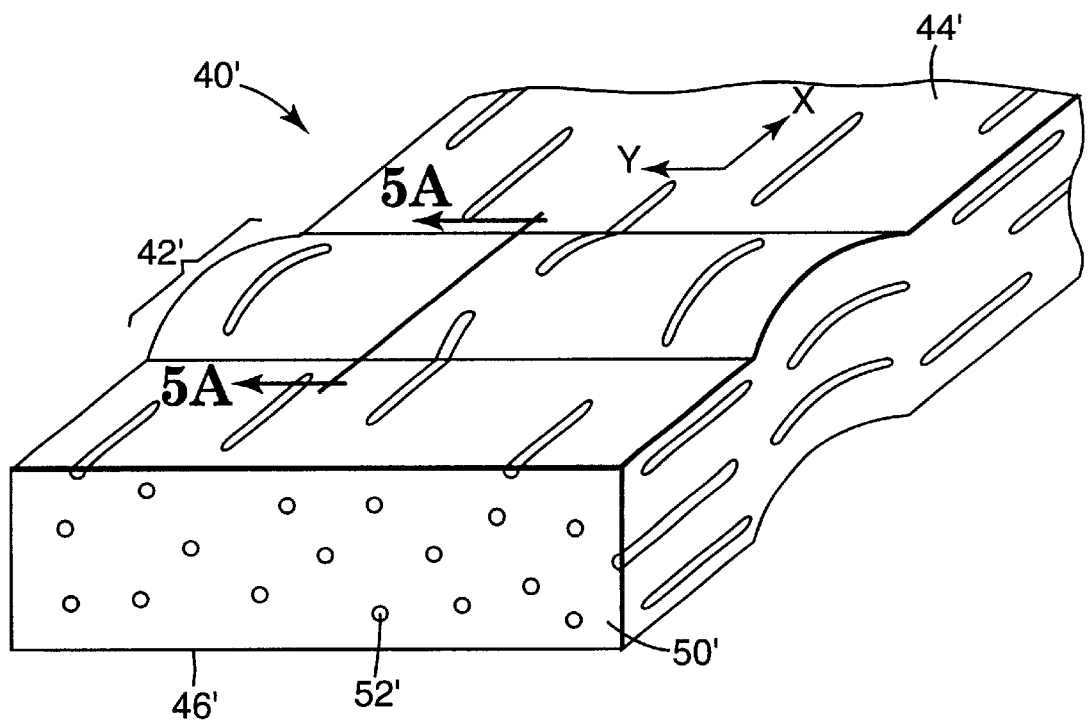
FIG. 5 is a plan view of a portion of one post-formed optical body according to the present invention including areas deformed along one in-plane direction.

FIG. 5 and cross-sectional view 5A illustrates an alternative embodiment of a post-formed optical film according to the present invention. The optical body 40' includes a first major side 44' and a second major side 46' (see FIG. 5A). Also illustrated are selected areas 42' in which the optical body 40' has been deformed. The selected areas 42' are depicted as being substantially uniform in size. It will however, be understood that the selected areas 42' may be non-uniform.

Referring back to FIG. 4, the selected areas 42 of optical body 40 are deformed along both in-plane axes (x & y). In contrast, the selected areas 42' of optical body 40' are preferably deformed along only one in-plane axis (the x axis in FIG. 5). If the optical body 40' is designed to operate as a reflective polarizer in the deformed areas 42', it may be desirable to deform those areas in the direction of maximum index difference. That should reduce post-forming extension in the matched refractive index direction. As a result, the reflective performance of the polarizing optical body 40' may be better maintained and, in some cases, increased extension along the proper direction may increase the desired reflectivity of the optical body 40'.

Where the optical body includes continuous and disperse phases and a reflective polarizer is desired, it may be preferred that the optical body 40' be deformed or stretched along substantially only one in-plane direction during post-forming. The disperse phase particles 52' are depicted as being dispersed within the continuous phase material 50' such that they are generally aligned along a common axis coinciding with the in-plane x-axis in the optical body 40' in FIG. 5. In other words, the long direction of the particles 52' are generally aligned with the in-plane x-axis. In some instances, it may be preferred that deformation of the optical body 40' (stretching) occur substantially along the x-axis. In other instances, it may be desirable to deform the optical body 40' along the in-plane y-axis, i.e., generally transverse to the common axis with which the particles 52' are generally aligned. Deformation during post-forming may also occur in one or more directions that are not aligned with either of the illustrated in-plane axes.

Figure 5A:
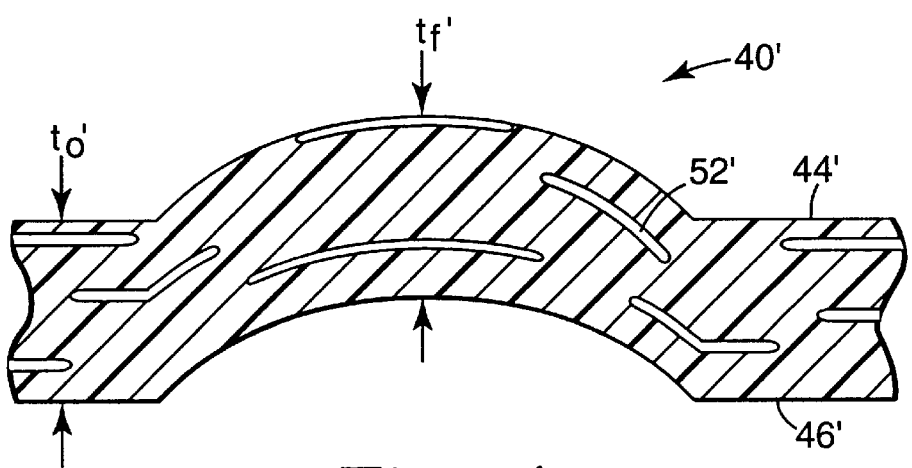
FIG. 5A is an enlarged partial cross-sectional view of the post-formed optical body of FIG. 5 taken along line 5A—5A.

One of the selected areas 42' and the surrounding optical body 40' is seen in the enlarged, partial cross-sectional view of FIG. 5A. The result of the post-forming is that the thickness of the optical body 40' varies. One of the ways in which that variation can manifest itself is that each of the selected areas 42' can form a depression in the otherwise generally smooth first major side 44' of the optical body 40'.

The deformations illustrated in FIGS. 4A–4C and 5A can be characterized by the ratio of the thickness $t_o$ in the undeformed portions of the optical bodies to the thickness $t_f$ of the deformed portions of the optical bodies. Both of those thicknesses are preferably measured between the major surfaces of the optical bodies, i.e., the thickness of any skin or other layers outside of the optical body including the continuous and disperse phase is not considered. It may be possible to obtain a ratio $t_o:t_f$ of at least about 1.1:1 or greater while significantly retaining the diffusely reflective properties of the optical body. In some cases, it may be possible to obtain a ratio $t_o:t_f$ that is at least about 1.5:1 or greater, more preferably at least about 1.75:1 or greater, and even more preferably at least about 2:1 or greater.

Figure 6:
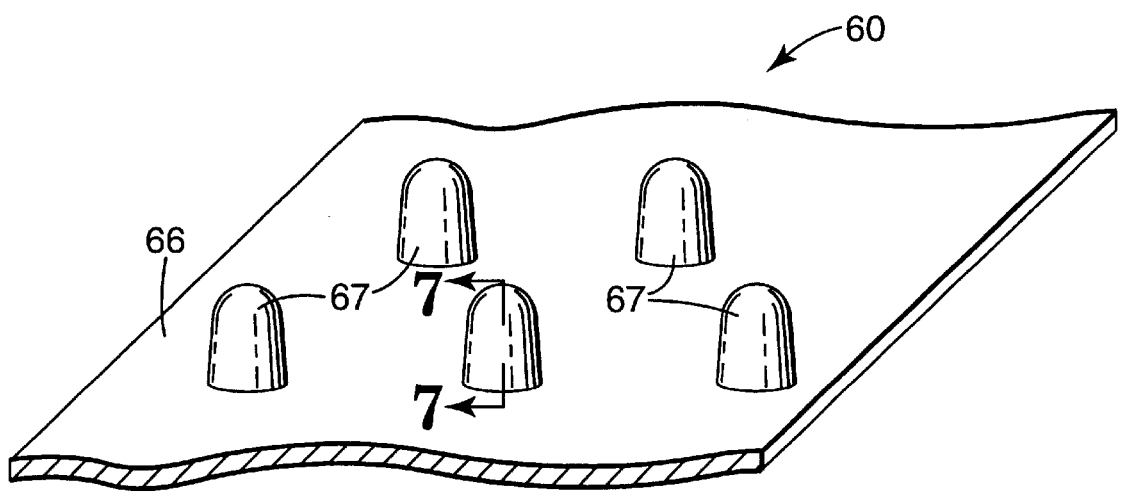
FIG. 6 is a perspective view of a portion of one post-formed optical body according to the present invention.
Figure 7:
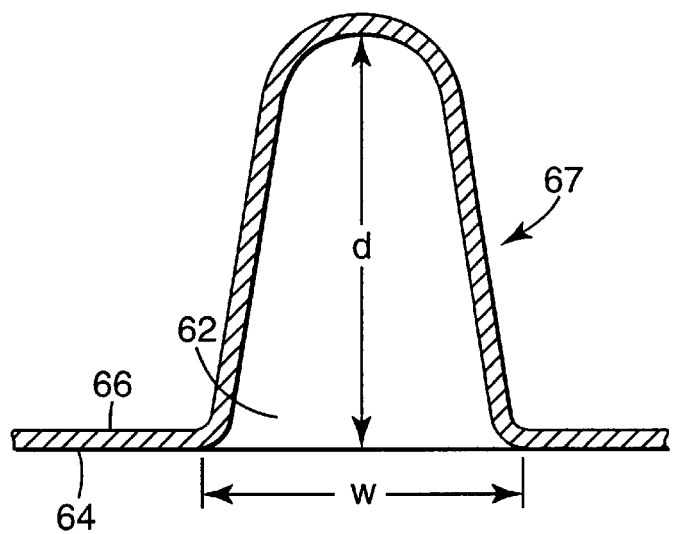
FIG. 7 is an enlarged partial cross-sectional view of the optical body of FIG. 6 taken along line 7—7 in FIG. 6.

FIGS. 6 and 7 illustrate a more extreme example of the post-formed optical body 240 illustrated in FIG. 4C. The post-forming illustrated in FIGS. 6 & 7 can be considered one example of a deep draw post-forming process. The optical body 60 of FIG. 6 includes a first major side 64 (see FIG. 7) and a second major side 66 along with a plurality of selected areas 62 in which the optical body 60 has been post-formed to provide depressed areas 62 formed on the first major side 64 of the optical body and raised areas 67 formed on the second major side 66 of the optical body 60.

The deformed areas of the deeply drawn optical body can also be characterized in this example by the aspect ratio of the width (w) of the depressed areas 62 as measured across the opening 63 of the depressed area 62 to the depth (d) of the depressed areas 62 as measured from the first major side 64 of the optical body 60. It is preferred that the width of the depressed area 62 be measured across its widest dimension. It may be desirable that the depressed areas 62 in a deeply drawn post-formed article have an aspect ratio w:d of about 2:1 or less, more desirably about 1:1 or less, and even more desirably about 0.5:1 or less.

Alternatively, the deformation in the optical body 60 can be measured in absolute terms. For example, it may be preferred that the depth d be at least about 0.1 millimeter or more; more preferably at least about 1 millimeter or more; and even more preferably at least about 10 millimeters or more. It will be understood that where the depth d of the depressed areas 62 approaches or exceeds the thickness of the optical body 60, the more likely it is that a raised area 67 will be formed on the second major side 66 of the optical body.

Figure 8:
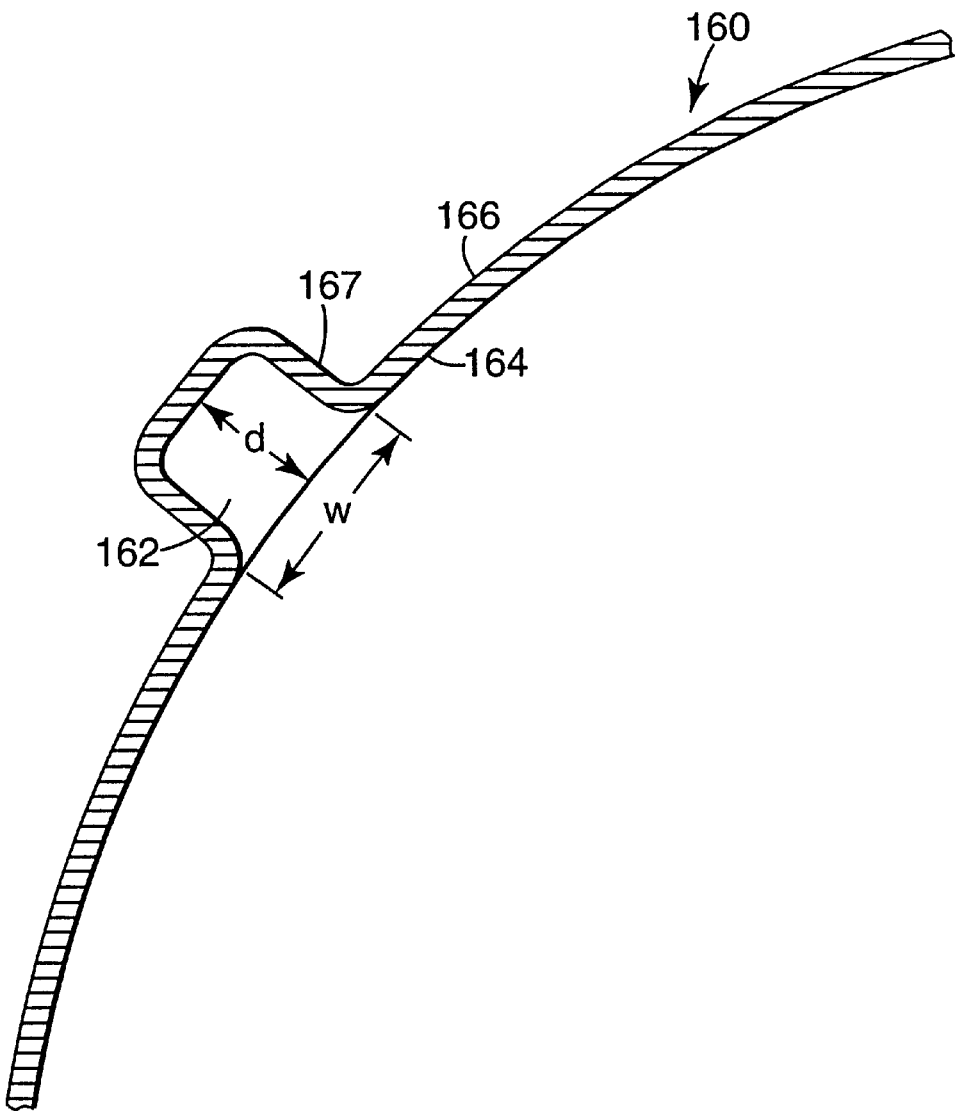
FIG. 8 is a partial cross-sectional view of another post-formed optical body according to the present invention.

The measurement of the depth d of the depressed areas 62 formed on the first major side 64 of the optical body 60 is not limited to those instances in which the first major side is planar. Turning now to FIG. 8, where the optical body 160 has a curved configuration. The optical body 160 includes a depressed area 162 formed on the first major side 164 of the optical body 160 and a corresponding raised area 167 on the second major side 166 of the optical body 160. The depth d of the depressed area 162 will preferably be measured from the geometric surface defined by the first major side 164 of the optical body 160 and will typically be the largest depth from that geometric surface.

Post-forming operations may be multi-step processes. For example, the nonplanar surface 160 may be formed in one operation while the depressed area 162 may have been formed in a second post-forming step.

Post-forming operations will typically, but not necessarily, employ heat to improve the working qualities of the optical body. The post-forming processes may also employ pressure, vacuum, molds, etc. to further improve the working qualities of the optical film, as well as increase the throughput of the process. For example, one typical post-forming method is thermoforming, including the various forms of vacuum or pressure molding/forming, plug molding, etc. Post-forming may also include re-drawing or stretching films or portions/areas of films in planar directions or stretching the films into non-planar or curved shapes.

Post-forming operations may include subsequent operations. For example, annealing steps may be used to further increase the crystallinity of the both shaped portions and the unshaped portions of the optical bodies. Alternatively, an annealing operation may not substantially change the overall level of crystallinity, but may provide an increase in the thermal stability of the final part. Other operations are also possible, including coating steps discussed previously.

Thickness variations in the optical body after post-forming are, in large part, caused by variations in the strain experienced in different areas of the optical body during post-forming. In other words, some areas of the optical body may experience significant deformation (strain) while other areas may experience little or no deformation during post-forming.

The optical bodies in the diffusely reflective articles will, as a result, often include variations in thickness as illustrated in FIGS. 4A–4C and 5A. In all areas of the optical body, however, it is preferred that the diffuse reflectivity of the optical body for the desired light (one or both polarizations) remain high for normal, as well as off-axis, light.

Figure 9:
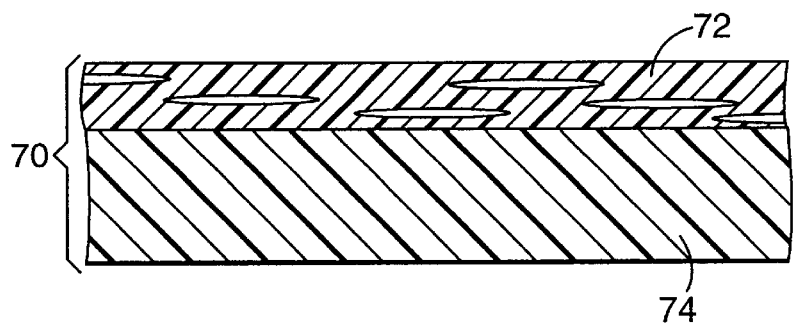
FIG. 9 is a cross-sectional view of a composite including an optical body and a substrate.

FIG. 9 illustrates another feature of diffusely reflective articles including optical bodies according to the present invention. In some instances the optical bodies alone may lack sufficient rigidity to provide the desired mechanical properties. For example, the optical bodies may lack sufficient structural strength and/or stiffness to hold a desired shape. FIG. 9 illustrates one solution to that problem in that the optical body 72 may be laminated to or otherwise attached to a substrate 74 to provide a composite 70 with the desired mechanical properties. In some instances, the substrate 74 may be manufactured integrally with the optical body 72, and in other cases the optical body 72 may be manufactured independently and later attached to the substrate 74 to form the composite 70. Both of those approaches are discussed in connection with the optical bodies of the present invention.

Although a substrate 74 is shown only one side of the optical body 72, it will be understood that a substrate could be provided on both sides of the optical body 72. In addition, although the substrate 74 is depicted as a single layer, it will be understood that it could be a composite of different layers of the same or different materials based on the desired characteristics of the substrate 74.

Preferred materials for the substrate 74 will have little, if any, effect on the optical properties of the optical body 72 but will provide a post-formable layer that is otherwise compatible with the optical body 72. In one aspect, the substrate 74 may simply supply desired structural stiffness/rigidity to the post-formed diffusely reflective article, thereby reducing the need to laminate the post-formed optical body to another structure. Examples of suitable materials for the substrate 74 include, but are not limited to polycarbonates, polyvinyl chlorides, PETG, acrylics, methacrylics, nylons, polyolefin, polypropylene, etc.

Another property that may be supplied by the substrate 74 is strain hardening during deformation. Strain hardening may be useful in limiting the stresses placed on the attached optical body 72, thereby acting to distribute the stresses over the optical body 72 in a way that improves the post-formability of the composite 70 over the post-formability of the optical body 72 alone.

Figure 10:
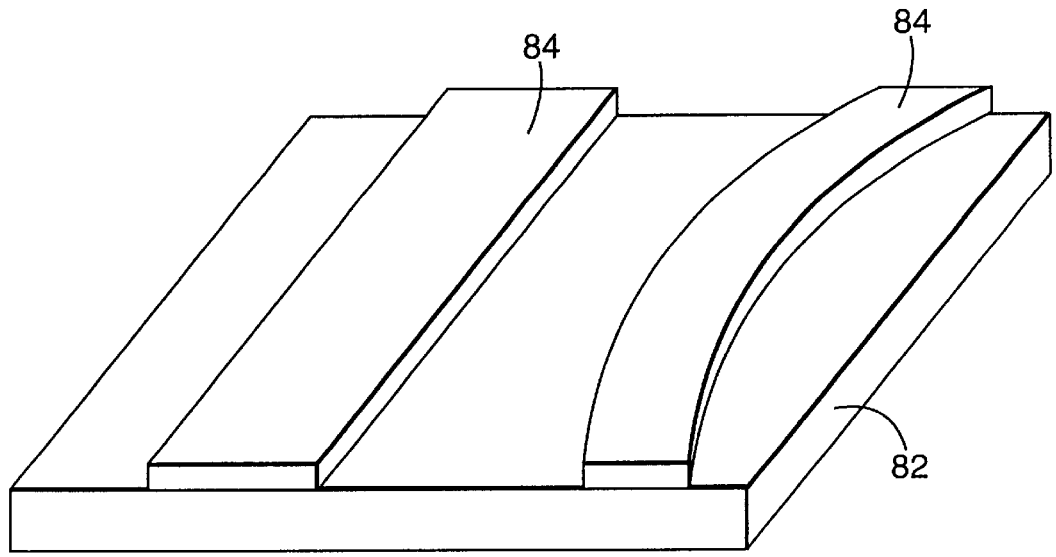
FIG. 10 is a plan view of the composite of FIG. 9 illustrating that the substrate may be provided in selected areas.

Although in many instances the substrate will be coextensive with the optical body, it is also envisioned that the substrate may be attached only on selected areas of the optical body as depicted in FIG. 10 where the substrate 84 is provided in strip form on the optical body 82. It will also be understood that the substrate 84 may be provided in the form of a mesh or other discontinuous body that is attached to the optical body 82 to improve its post-formability. It may, for example, be advantageous to provide the substrate 84 discontinuously in manners that assist in defining the selected areas of the optical body desired to be thinned. In such an application, the substrate 84 may prevent or reduce drawing of the optical body 82 during post-forming in manners that are difficult or impossible to achieve through the use of post-forming or shaping techniques alone.

Figure 11:
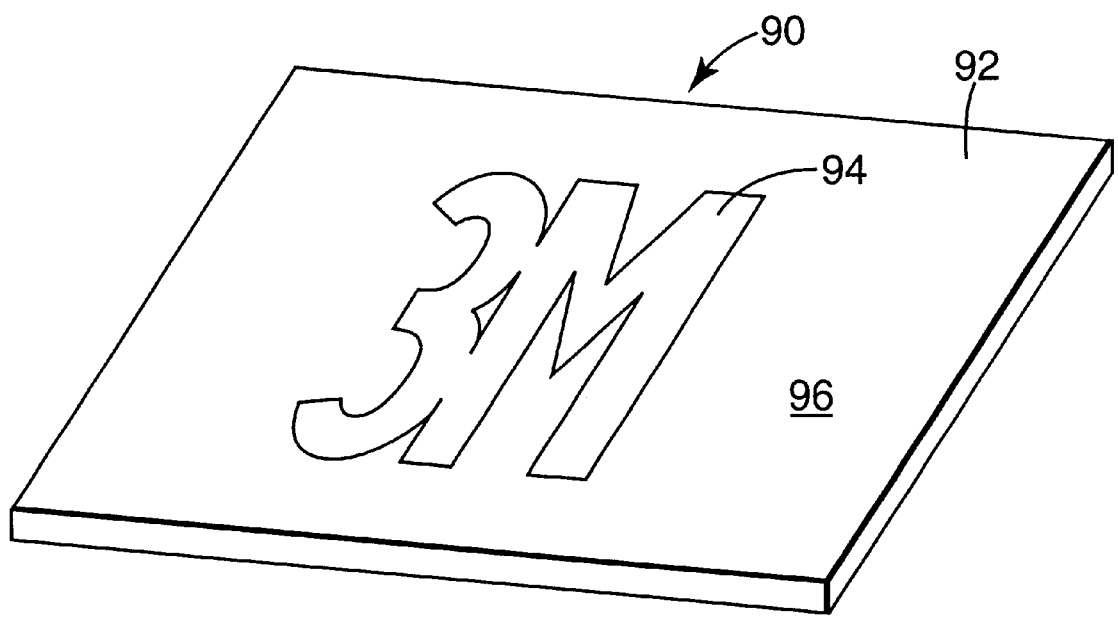
FIG. 11 is a perspective view of an article including a post-formed optical body in which selected areas have different optical properties.

FIG. 11 illustrates another variation in post-forming of optical bodies in connection with the present invention. The variation depicted in FIG. 11 is that in which a selected area of an optical body is post-formed to provide a diffusely reflective post-formed article with a non-uniform appearance or optical properties. For example, it may be desired to provide post-formed article in which one or more selected areas of the optical body are more or less diffusely reflective than other areas of the optical body. To accomplish that result using an optical body that is, as manufactured, uniformly diffusely reflective, selected areas of the optical body could be stretched or thinned during the post-forming process such that the diffusely reflective properties, e.g., polarization selective reflectance, are changed by the post-forming.

One example of an article manufactured from a post-formed optical body that is deformed in selected areas is depicted in FIG. 11. The article 90 is a light box including a cover 92 that includes selected areas 94 in the shape of indicia, in this case alphanumeric characters. In one embodiment, the cover 92 can be post-formed such that the portion of the optical body in the background area 96 surrounding the selected areas 94 is thinned during post-forming such that the optical body in the background area 96 is more or less reflective/transmissive while the reflectivity/transmissivity of the selected areas 94 remains substantially unchanged. In another embodiment, the reflectivity/transmissivity of the background areas 96 may be maintained while the selected areas 94 are deformed or thinned to provide a different optical effect from the background area 96. Other variations on the construction and manufacture of articles including post-formed multilayer optical film in which selected areas are post-formed can also be envisioned based on the examples discussed above.

For reflective polarizers, it may be desirable to start with a relatively poor reflective polarizer, i.e., one that does not selectively transmit substantial portions of light of either polarization orientation and convert at least portions of the optical body into a better reflective polarizer. By "better", it is meant that at least a portion of the post-formed optical body transmits light of one polarization orientation at higher levels than light of the orthogonal polarization orientation after post-forming than before post-forming. The increased selectivity may be the result of increased transmission of light of one polarization orientation, increased polarization-specific reflection, increased polarization—specific absorption, and combinations of the above.

Alternatively, it may be desirable to start with a "good" reflective polarizer, i.e., one that reflects a substantial portion of light of a first polarization and transmits a substantial portion of light of a second orthogonal polarization orientation, and reduce its polarization selectivity. In other words, the change would cause at least a portion of the optical body to reflect less light of the first polarization orientation and/or transmit less light of the second orthogonal polarization orientation. The changes in reflection of the first polarization orientation could be caused by increasing its transmission and/or absorption by the post-formed optical body. The changes in transmission of the second polarization orientation could be caused by increasing its reflection and/or absorption by the post-formed optical body.

In either of the above cases, the selected area or areas of the optical body in which the changes occur as a result of post-forming may provide a different appearance than those areas that are not deformed to the same levels during post-forming.

Although some specific examples of diffusely reflective articles including optical bodies having continuous and disperse phases have been described above, it will be understood that such optical bodies may be formed or shaped into a wide variety of diffusely reflective articles. For example, the present invention may find use in the automotive industry for, e.g., trim pieces, bezels, knobs, and the like. The articles may also find application in trim articles for consumer appliances including refrigerators, dishwashers, washers, dryers, radios, and the like. They may also find use as toys or novelty items. Other applications for post-formed articles according to the present invention include light guides and/or pipes, shaped reflectors for exterior lighting applications, bulb reflectors for use in, e.g., backlit computer displays, medical/dental instruments, etc.

Furthermore, the diffusely reflective articles according to the present invention may be constructed entirely of diffusely reflective optical bodies as described herein or they may only include optical bodies in their construction. If the optical body constitutes only a portion of the article, it will be understood that the optical body could be integrated into larger assemblies by any suitable techniques, such as insert injection molding, ultrasonic welding, adhesive bonding, and other techniques.

Process Considerations

Because the optical bodies used in connection with the present invention may rely on birefringent materials that provide strain-induced refractive index differentials to obtain the desired optical properties, variations in deformation of the optical bodies during post-forming can be particularly problematic.

As discussed above, the index of refraction differentials between the different phases in the optical bodies as manufactured are, at least in part, the result of drawing of the optical bodies during manufacturing which causes the indices of refraction of the birefringent materials to change. Those changes cause refractive index differentials large enough to provide the desired reflective properties. Because the strain induced in the optical bodies during manufacturing is largely uniform, the strain-induced index of refraction differentials are also largely uniform over the optical bodies, and the resulting diffusely reflective properties are also largely uniform.

In post-forming processes the birefringent materials in the optical bodies are subjected to additional strain. One difference from manufacturing of the optical bodies is, however, that the strain induced during post-forming is not uniform over the optical body. The variations in thickness of the optical body as a result of post-forming as discussed above are, in part, indicative of the variations in strain over the post-formed optical bodies.

As a result, if the birefringent materials in the optical bodies are capable of further strain-induced index of refraction changes, the index of refraction differentials in the optical bodies may be changed as a result of post-forming. In addition, the shape of the disperse phase particles may also be changed as a result of post-forming. Furthermore, if the strain induced during post-forming is not uniform over the optical body, the index of refraction changes and/or shape changes in the disperse phase particles of the post-formed optical body may also be non-uniform and may result in non-uniform optical properties in the post-formed optical body.

In addition to non-uniform post-forming strain-induced changes, another difficulty associated with post-forming multilayer optical films including strain-induced refractive index differentials in connection with birefringent materials is that many post-forming processes employ heat to improve the working properties of the optical body during deformation. The strain-induced changes in the refractive indices of the birefringent materials in the optical body are typically the result of strain-induced crystallization of the birefringent materials. The strain-induced crystallization and corresponding refractive indices can, however, be changed when the birefringent materials are subjected to heat during post-forming.

For example, heating may result in increased crystallization due to the heat during post-forming or decreased crystallization as a result of melting or relaxation during post-forming. In either case, changes in the crystallization level of the birefringent materials can result in a change in the refractive index differentials in the optical body. The potential crystallization changes in the birefringent materials may be further exacerbated by the simultaneous post-forming deformation and heating of the optical body which, in combination, may cause greater changes in the recrystallization/refractive index of the birefringent materials than either action alone.

The present invention, however, overcomes these difficulties to provide diffusely reflective articles including post-formed optical bodies and methods of producing those articles. These results are achieved even though the preferred optical bodies used in connection with the present invention include birefringent materials and rely, at least in part, on strain-induced refractive index differentials to obtain the desired optical properties.

In the post-forming methods of the present invention in which optical bodies including birefringent materials are used, it may be desirable to heat the optical bodies to forming temperatures that are near to, but below, the peak crystalline melting temperatures of the birefringent materials. Such heating can improve the extensibility of the optical bodies during post-forming processing. By heating the optical body to those levels, the tendency of the optical body to fracture or tear at a given draw ratio during post-forming may be decreased. In addition, the forces required to post-form the optical bodies may be reduced as a result of the increased forming temperature.

Because processing under these conditions is in the melting regime, precise temperature control is desirable to ensure uniform drawing and reduce or prevent damage to the post-formed articles produced using the optical bodies. Such damage could take the form of complete melting, with concomitant loss of birefringence and/or hole formation in the post-formed articles.

Reducing the stress required for a given amount of deformation during post-forming may reduce the tendency of the materials in the optical body to fracture, thereby enhancing extensibility. Heating the optical body to a forming temperature near the peak crystalline melting temperature of the birefringent material in the optical body may also enhance extensibility by melting less perfect crystals, thereby loosening the morphological microstructure in the birefringent material.

For example, one material used in some preferred optical bodies for use in connection with the present invention is polyethylene naphthalate (PEN), which has a peak melting point of about 270 degrees Celsius (520 degrees Fahrenheit) using standard differential scanning calorimetry. The onset of melting is, however, often seen at about 255 degrees Celsius (490 degrees Fahrenheit) or below. This onset of melting may be attributable to the melting of less than perfect crystals within the PEN with the peak melting temperature being that point at which all or nearly all of the crystals in the material have melted. Heating the birefringent materials in the optical body may also increase mobility within the microstructure, thereby activating crystal slip and other deformation mechanisms that could enhance extensibility of the optical body. It should be noted that a different relationship will exist between the preferred post-forming temperature and the melting temperature for different materials. For example, copolymers of PEN may facilitate post-forming operations by altering either or both the peak melting temperature and the onset of melting.

The extent to which heating may improve extensibility of the optical bodies used in connection with the present invention will, at least in part, vary based on the materials used in the optical bodies. Some materials may exhibit larger increases in extensibility when heated as compared to others. Furthermore, the combination of materials within each of the optical bodies can also affect improvements in extensibility of the optical body as a whole.

For example, to improve the extensibility of the optical bodies including at least one birefringent material, it may be preferred to heat the optical bodies to a forming temperature in the range of from about 30 degrees Celsius (about 55 degrees Fahrenheit) below the peak crystalline melting temperature of the birefringent material up to about the peak crystalline melting temperature of the birefringent material during post-forming. It may be more preferred to heat the optical body to a forming temperature in the range of from about 15 degrees Celsius (about 30 degrees Fahrenheit) below the peak crystalline melting temperature of the birefringent material up to about the peak crystalline melting temperature of the birefringent material during post-forming. These forming temperatures may increase extensibility and reduce the likelihood of fracture of the optical bodies during post-forming processing.

One way to improve uniformity in the optical body during post-forming is to include materials in the optical body that are subject to strain hardening during deformation. Strain hardening is a property of materials in which the stress required to achieve a particular level of strain increases as the material is strained (i.e., stretched). Essentially, strain hardening materials may provide self-regulation of the thinning process due to post-forming.

In terms of molding, as the optical body is stretched during post-forming, unquenched sections of the optical body that have not yet made contact with a mold surface will tend to draw more uniformly after the onset of strain hardening. As a result, those portions of the optical body that have been stretched to the point at which strain hardening occurs will progressively stretch less while those portions of the optical body that have not experienced strain hardening will continue to stretch at faster rates. The end result is that the thinner (i.e., strain hardened) portions of the film will thin to a certain point after which the thicker portions of the optical body will continue to stretch and become thinner, effectively evening out the stretching or thinning of layers in the optical body during post-forming processing. This reinforcement effect of strain hardening is also operative in post-forming processes in which no mold is present to provide quenching of the optical body during post-forming. One material that provides strain hardening properties in an optical body is PEN. In general, strain hardening is typically observed in many semi-crystalline polymers at high enough levels of strain.

The effect of strain hardening may also influence the degree to which vacuum-forming as one post-forming process will allow for adequate or desirable mold replication. Pressurized or plug assisted molding techniques may be needed for accurate post-forming processing of materials in which strain hardening potentially increases the resistance of the optical body to stretching during the molding process. The effect of strain hardening may be influenced by both the post-forming draw conditions and the degree of draw (strain hardening) before post-forming is initiated.

EXAMPLES

Advantages of the invention are illustrated by the following examples. However, the particular materials and amounts thereof recited in these examples, as well as other conditions and details, are to be interpreted to apply broadly in the art and should not be construed to unduly limit the invention.

Sample Preparation

Stretching or orienting of samples was provided using either conventional orientation equipment used for making polyester film or a laboratory batch orienter. The laboratory batch orienter was designed to use a small piece of cast material (e.g., 7.5 cm by 7.5 cm) held by a square array of 24 grippers (6 on each side). A hot air blower controlled the orientation temperature of the sample, and the film was oriented through a mechanical system that increased the distance between the grippers in one or both directions at a controlled rate. Samples stretched in both directions were oriented simultaneously with approximately equal draw ratios in each direction. Samples stretched in only one direction were held at a constant width in the unstretched direction.

Optical Characterization

Diffuse transmission of collimated polarized light was measured using a Perkin Elmer Lambda 19 ultraviolet/visible/near infrared spectrophotometer equipped with a Perkin Elmer Labsphere S900–1000 150 millimeter integrating sphere accessory and a Glan-Thompson cube polarizer. Parallel and crossed transmission values were measured with the e-vector of the polarized light parallel or perpendicular, respectively, to the pass axis of the optical polarizing film. Incident light was collimated and is normal to the plane of the film. All scans were continuous and were conducted with a scan rate of 480 nanometers per minute and a slit width of 2 nanometers. Transmission values were averages of all wavelengths from 400 to 700 nanometers. Transmission values were also normalized for thickness using the equations shown below.

$$T^{norm}=[(1-R^{norm})(1-r_1)^2]/[2r_1R^{norm}(r_1-1)+(1-r_1^2)] \quad \text{Eqn. 1:}$$

where $$r_1=[(1-n)/(1+n)]^2; \quad \text{Eqn. 2:}$$

$$R^{norm}=(Ah^{norm})/(2+Ah^{norm}); \quad \text{Eqn. 3:}$$

$$A=2R/[h(1-R)]; \quad \text{Eqn. 4:}$$

$$R=[(1-r_1)^2-T(1-r_1^2)]/[2r_1T(r_1-1)+(1-r_1)^2]; \quad \text{Eqn. 5:}$$

n is the refractive index of the continuous phase; h is the thickness of the optical layer comprising the blend materials; $h^{norm}$ is 101.6 microns; T is the transmission of the film, where for optically polarizing films T can be either the transmission of the pass polarization or the block polarization; and $T^{norm}$ is the calculated transmission for a film comprising an optical layer whose thickness is $h^{norm}$.

For films of the present invention that were reflective to both polarizations of light, only a single transmission value was assessed. For some of these films, two additional optical properties were also determined. The first of the two properties was the total reflectance, $R_{Total}$. The total reflectance is a sum of the diffuse reflectance, $R_{Diffuse}$, and the specular reflectance. The specular reflectance is defined as that light which is reflected in a solid cone within 8 degrees about the primary angle of reflectance. A portal exists in the integrating sphere, such that when it is removed, only the diffuse component of the reflected light was measured. A value of about one for the ratio of $R_{Diffuse}$ to $R_{Total}$ implied that the reflectance was largely diffuse. A value of about zero for the ratio implied that the reflectance was largely specular.

Example 1

Example 1 illustrates exemplary process conditions in which blends of continuous phase and disperse phase materials can be made into optically polarizing films.

Example 1 was a three layer web. The three layers included a core layer and outer layers on each side of the core layer. All three layers were of approximately the same thickness. The core layer material was a coPET having an IV of 0.65 measured in methylene chloride. The coPET was a copolymer based on 80 mole % dimethylterephthalate and 20 mole % dimethylisophthalate and ethylene glycol. The outer layer material was a blend, comprising 52.3 weight % coPEN; 45 weight % Questra MA 405 available from Dow Chemical Company; and 2.7 weight % Dylark 332–80 available from Nova Chemical Company. The coPEN copolymer was based on 70 mole % naphthalene dicarboxylate and 30 mole % dimethylterephthalate and ethylene glycol. The thickness of the cast web was 840 microns.

Example 2

Example 2 was formed from a piece of Example 1 that was drawn uniaxially 2:1 in a laboratory stretcher at a draw temperature 124° C. and at a stretch rate of 20 percent per second. The thickness of the final film was 435 microns. Example 2 had a normalized average transmission of 82.8% for light whose polarization was aligned with the pass direction of the optical polarizing film. Light whose polarization was aligned with the block direction of the film had a normalized average transmission of 72.7%.

Examples 3–5

Examples 3 through 5 were made in a manner similar to Example 2, except the draw ratios varied. The normalized pass polarization transmission ($T_p^{norm}$) and normalized block polarization transmission ($T_b^{norm}$) values are shown below. The transmission values for Example 4 were not normalized and are indicated with an asterisk.

| Example | Draw Ratio | Thickness (microns) | % $T_p^{norm}$ | % $T_b^{norm}$ |
|---|---|---|---|---|
| 3 | 3:1 | 293 | 83.4 | 55.4 |
| 4 | 4:1 | — | 81.7 * | 30.3 * |
| 5 | 5:1 | 169 | 85.5 | 25.4 |

Example 6

Example 6 exemplifies a two step process of first forming an optical polarizing film and then reshaping the film.

Example 6 was formed by further uniaxially orienting Example 2 under the same process conditions until the total draw ratio of the final film was 5:1. The thickness of the final film was 161 microns. Example 6 had a normalized average pass polarization transmission of 84.3% and a normalized average block polarization transmission of 26.0%.

The optical properties of polarizing film Example 6 were substantially identical to polarizing film Example 5.

Examples 7–8

Examples 7 and 8 were made from Examples 3 and 4, respectively. Examples 7 and 8 were drawn a second time in a manner similar to Example 6, such that the total draw ratio of the final films was each 5:1. The thickness of the final film was 183 microns for Example 7, which had a normalized pass polarization transmission of 84.5% and a normalized block polarization transmission of 28.7%. Example 8 had a normalized pass polarization transmission of 84.5% and a normalized block polarization transmission of 25.7% and a final film thickness of 180 microns.

The optical properties of Examples 6 through 8 were substantially identical to Examples 5 and 6. Hence, Examples 6 through 8 demonstrated that optical films of the present invention could be formed and reshaped while maintaining or even improving their optical polarizing characteristics.

Example 9

Example 9 was made using a conventional polyester maker line. The stretch ratio in the length orienter was 1.25:1. The temperature of the last roll prior to length orientation was 88° C., and the power of the infrared lamps over the stretch zone was 90%. The final transverse draw ratio was approximately 4.9:1 based on the rail settings at the entrance and exit of the tenter. The stretch temperature was 118° C. The heat set temperature was 163° C. The thickness of the final optical film was approximately 190 microns, of which the blend layer material comprised approximately 127 microns. Example 9 had a normalized pass transmission of 85.5% and a normalized block transmission of 20.7%.

Examples 10–11

Examples 10 and 11 exemplify shaped optical films made by bending.

Pieces of Example 9, 7 cm by 40 cm, were shaped by placing them into hollow glass cylinders. Glass cylinders with an inner diameter of approximately 6 cm and 10 cm were used for Examples 10 and 11, respectively. The films were then placed into an oven for 5 minutes at 100° C. before being allowed to cool to room temperature. In both cases, the films retained their cylindrical shape once removed from the cylinder. The optical properties as indicated by the pass transmission and block transmission were essentially unchanged. For Example 10, the normalized pass transmission was 83.6%, and the normalized block transmission was 18.5%. For Example 11, the values were 82.2% and 18.2% respectively. The thickness of the final shaped article is equivalent to that of the film prior to shaping.

Example 12

Example 12 was made in accordance with Examples 10 and 11 except the shape of the mold was a solid rectangle. The mold was in two parts: a female part whose dimensions of the hollowed rectangle were 8 cm wide by 11 cm long by 4 cm deep, and a male part whose dimensions were only slightly smaller to allow easy insertion into the female mold half. The edges of the rectangle were rounded to approximate the curvature of a circle whose diameter is 4 cm. The shaping process involved inserting a piece of film of Example 9 in between the two parts of the mold prior to heating to 100° C. for 5 minutes followed by cooling to room temperature. The dimensions of the film prior to shaping, about 7 cm by 25 cm, were somewhat narrower than the width of the mold. This allowed the film to slip between the parts of the mold during the insertion and molding processes. After cooling, the film retained the shape of the portion of the mold that it filled. The normalized pass transmission was 83.5%, and the normalized block transmission was 18.7%. The thickness of the final shaped article is equivalent to that of the film prior to shaping.

Example 13

Example 13 exemplifies shaped optical films by billowing into cavities made through the use of heat and differential pressure.

To the surface of a 0.3 cm thick piece of aluminum with a 2.7 cm circle hole in the center, where the cavity beneath the hole was several centimeters deep, a 9 cm by 12 cm piece of film from Example 9 was secured using 2.5 cm wide 3M Filament tape.

A vacuum of approximately 5 torr was first applied to one face of the film. Hot air was then used to heat the area of the second face of the film to be shaped. The temperature of the hot air ranged from about 190° C. to about 210° C. Heating times were between 3 and 8 seconds. The actual time was limited to that minimally required to allow deformation of the film into the cavity.

The resulting molded shape was that of a surface of a sphere whose diameter was approximately 4.2 cm and whose maximum chord length was about 2.7 cm. The maximum depth of draw for the spherically molded portion of the film was about 0.4 cm at the center of the post-formed shape. The ratio of the maximum depth of draw to the maximum chord length was 0.15.

The thickness of the film prior to shaping was 151 microns. The thickness of the film at the apex of the post-formed shape was 141 microns. The normalized pass transmission was 80.7%, and the normalized block transmission was 16.5%.

Example 14

Example 14 was processed in a manner similar to Example 13 with the exception that the circular cavity of the mold was 4.6 cm in diameter. The resultant shape of the molded film was the surface of a sphere whose diameter was approximately 7.5 cm. The maximum depth of draw for the spherically molded portion of the film was about 0.65 cm at the apex of the post-formed shape. The ratio of the maximum depth of draw to the maximum chord length was 0.14.

The thickness of the film in the apex of the spherical shape was 149 microns. The normalized pass transmission was 80.3%, and the normalized block transmission was 15.5%.

Examples 15–16

Additional shapes were made in accordance with Example 14. The vacuum level was 165 torr, and the shape of the cavity was a rectangle with semicircular end caps whose diameter was equal to the width of the rectangle. The width of the rectangle was 2.5 cm and the maximum length was 10.2 cm. The resultant shape of the post-formed film was similar to that of a portion of a solid ellipse. The cross section across the width of the mold was also elliptical.

For Example 15, the machine direction of the film was oriented to be collinear with the long axis of the rectangular cavity. The maximum depth of the post-formed film was 0.6 cm. The position of the maximum deformation occurred at or near the center of the post-formed shape. The thickness of the film prior to post-forming was 161 microns. The thickness of the center of the molded part, i.e. the thinnest section, was 120 microns. The normalized pass transmission was 78.4%, and the normalized block transmission was 15.4%.

For Example 16, the machine direction of the film was oriented to be collinear with the short axis of the rectangular cavity. The maximum depth of the post-formed film was 1.5 cm, and the maximum deformation occurred at or near the center of the shaped part. The thickness of the film prior to post-forming was 172 microns. The thickness of the center of the molded part, i.e. the thinnest section, was 141 microns. The curvature of the sample made it difficult to accurately evaluate the transmission of the pass and block states.

It is well known that the properties of the final molded article will depend upon the molding process variables such as molding temperature and preheat time, depth and rate of draw, initial film thickness, amongst others. The differences in the depth of draw between Examples 15 and 16 demonstrate another effect, namely the dependence of the properties of starting film on the final molded shape. These properties will vary depending upon how the starting film was originally processed, such as, e.g., the draw ratio and draw rate in machine and transverse directions, draw temperature, and heat set temperature.

Example 17

The following Examples illustrate exemplary process conditions in which blends of continuous phase and disperse phase materials can be made into diffusely and specularly reflective films.

Example 17 was made in a manner similar to Example 1, except the materials of the various layers were altered. The core layer material was PEN homopolymer. The outer layer material was a blend, comprising 60 weight % PEN and 40 weight % PMMA (CP-82 available from Ashland Chemical). The thickness of the cast web was approximately 940 microns.

Example 18

Example 18 was formed from a piece of Example 17 that was drawn simultaneously in both the machine and transverse directions using a laboratory stretcher. The draw ratios were 2.1:1 in the machine direction and 2.1:1 in the transverse direction to give a biaxial draw ratio of 4.4:1. The draw temperature was 129° C., and the strain rate was 20 percent per second. The thickness of the final film was 269 microns. Example 18 had a normalized transmission of 32.7%.

Examples 19–21

Examples 19 through 21 were made in a similar manner to Example 18, except the draw ratios varied. The normalized transmission values and final film thickness are shown below. The draw ratios in the machine and transverse directions were approximately equal.

| Example | Biaxial Draw Ratio | Thickness (microns) | % T$^{norm}$ |
|---|---|---|---|
| 19 | 6.75:1 | 147 | 20.9 |
| 20 | 10.6:1 | 83 | 15.8 |
| 21 | 14.8:1 | 58 | 12.7 |

Example 22

Example 22 exemplifies a two step process of first forming an optically reflective film and then reshaping the film.

Example 22 was formed by further biaxially orienting Example 18 under the same process conditions until the biaxial draw ratio of the final film was 14.4. The final film thickness was 53 microns. Example 22 had a normalized average transmission of 12.9%. The optical transmission of the film from Example 22 is substantially identical to reflective film Example 21.

Examples 23–24

Examples 23 and 24 were made from Examples 19 and 20, respectively. Examples 23 and 24 were drawn a second time in a manner similar to Example 22, such that the total biaxial draw ratio of the final films was each nominally 14.4. The thickness of the final film was 57 microns. Example 23 had a normalized transmission of 12.7%. Example 24 had a normalized transmission of 13.1%, and a final film thickness of 60 microns.

The optical properties of Examples 23 and 24 are substantially identical to Examples 21 and 22. Hence, Examples 22 through 24 demonstrated that optical films of the present invention could be formed and reshaped while maintaining or even improving their optical characteristics.

Examples 25–27

Examples 25 through 27 were made in a manner similar to Example 13. The heating times were varied slightly between the Examples to provide for different levels of post-forming.

The thickness of the post-formed film varied across the shaped piece and was smallest at the apex of the hemisphere. The appearance of the shaped portions of Examples 25 through 27 changed from that of the starting film Example 18 as well as from the unshaped portions of Examples 25 through 27. Example 18 and the unshaped portions of Examples 25 through 27 were white in appearance, suggesting predominantly diffuse reflection of visible light. The shaped portions of Examples 25 through 27 exhibited a silvery or pearlescent color. The normalized transmission values were measured and are shown below.

| Example | Thickness (microns) | % $T^{norm}$ |
| --- | --- | --- |
| 25 | 90 | 17.3 |
| 26 | 71 | 13.4 |
| 27 | 48 | 8.5 |

Example 28

Example 28 exemplifies an optical film that retains its optical performance following post-forming.

A piece of film made from Example 20 was post-formed in a manner similar to Example 26. The final thickness of the film at the apex of the hemisphere was 81 microns, and the normalized transmission was 14.0%. The appearance of film before and after post-forming was substantially identical and was silvery in color.

Comparative Examples 1–2

An attempt was made to quantify the degrees of diffuse and specular reflectivity for films of the present invention. As described previously, $R_{Diffuse}$ and $R_{Total}$ were measured, and the ratio, $R_{Diffuse}/R_{Total}$, was calculated.

Two optical films were also evaluated to assess the ranges of diffuse and specular reflectance. Comparative Example 1 was a microporous film made in accordance with U.S. patent application Ser. No. 08/957,558 and was white in appearance.

Comparative Example 2 was a multilayer mirror similar to that described in Example 2 of U.S. patent application Ser. No. 08/494,366 and was highly specularly reflecting. It was mirror-like in appearance.

| | % $R_{Total}$ | % $R_{Diffuse}$ | % $R_{Diffuse}$/% $R_{Total}$ | Appearance |
| --- | --- | --- | --- | --- |
| Comp. Ex. 1 | 97.2 | 96.3 | 0.99 | White |
| Ex. 28 | 77.5 | 57.9 | 0.75 | Silvery |
| Comp. Ex. 2 | 96.3 | 3.2 | 0.03 | Mirror-like |

Example 28 demonstrated that an optical film comprising a blend of thermoplastic polymers can be made that exhibit a substantial degree of specular reflectivity.

The patents, patent applications, patent documents, and publications cited herein are incorporated by reference in their entirety, as if each were individually incorporated by reference. Various modifications and alterations of this invention will become apparent to those skilled in the art without departing from the scope of this invention, and it should be understood that this invention is not to be unduly limited to the illustrative embodiments set forth herein.

What is claimed is:

1. A method of manufacturing a diffusely reflective article, said method comprising:
    providing an optical body having a generally sheet-like configuration, said optical body comprising:
        a first phase having a birefringence of at least about 0.05; and
        a second phase, disposed within said first phase, whose index of refraction differs from said first phase by greater than about 0.05 along a first axis and by less than
        about 0.05 along a second axis orthogonal to said first axis;
        wherein diffuse reflectivity of said first and second phases taken together along at least one axis for at least one polarization of electromagnetic radiation is at least about 30%;
    post-forming said optical body into a diffusely reflective article, wherein a selected area of said optical body undergoes permanent deformation, and further wherein said selected area of said optical body comprises only a portion of said optical body.

2. A method according to claim 1, wherein said selected area of said optical body exhibits diffuse reflectivity of said first and second phases taken together along at least one axis for at least one polarization of electromagnetic radiation of at least about 30%.

3. A method according to claim 1, wherein said first and second phases taken together exhibit diffuse reflectivity along said at least one axis of at least about 50% for both polarizations of electromagnetic radiation in said selected area before and after post-forming.

4. A method according to claim 1, wherein said optical body exhibits a total reflectivity of greater than about 50% for a first polarization of electromagnetic radiation and a total transmission of greater than about 50% for a second polarization of electromagnetic radiation orthogonal to said first polarization in said selected area before and after post-forming.

5. A method according to claim 4, wherein said optical body exhibits a total reflectivity of greater than about 60% for said first polarization of electromagnetic radiation in said selected area after post-forming.

6. A method according to claim 4, wherein said optical body exhibits a total reflectivity of greater than about 70% for said first polarization of electromagnetic radiation in said selected area after post-forming.

7. A method according to claim 4, wherein said optical body exhibits a total transmission of greater than about 60% for said second polarization of electromagnetic radiation in said selected area after post-forming.

8. A method according to claim 1, wherein said post-forming further comprises thinning said selected area of said optical body along a third axis that is mutually orthogonal to said first and second axes.

9. A method according to claim 8, wherein said thinning is non-uniform.

10. A method according to claim 8, wherein said optical body has a generally uniform thickness $t_o$ as provided and said thinning comprises reducing the thickness of at least a portion of said selected area of said optical body from the thickness $t_o$ to a thickness $t_f$, and further wherein the ratio $t_o:t_f$ is at least about 1.1:1 or greater.

11. A method according to claim 10, wherein said ratio is at least about 1.5:1 or greater.

12. A method according to claim 1, wherein said post-forming comprises stretching said optical body along at least one in-plane axis, and further wherein the permanent deformation is strain-induced.

13. A method according to claim 1, wherein said post-forming comprises stretching said optical body along at least one in-plane axis to a draw ratio of at least about 2.

14. A method according to claim 1, wherein said post-forming comprises stretching said optical body along at least one in-plane axis to a draw ratio of at least about 4.

15. A method according to claim 1, further comprising heating said optical body to a forming temperature.

16. A method according to claim 1, wherein the index of refraction of said second phase differs from the index of refraction of said first phase by less than about 0.03 along said second axis before post-forming and less than about 0.05 after post-forming.

17. A method according to claim 1, wherein said second phase is discontinuous along at least two of any three mutually perpendicular axes.

18. A method according to claim 1, wherein said optical body is a film, and wherein the index of refraction of said first phase differs from the index of refraction of said second phase by less than about 0.05 along an axis perpendicular to a surface of said film.

19. A method of manufacturing a diffusely reflective article, said method comprising:
  providing an optical body having a generally sheet-like configuration, said optical body comprising:
    a first phase having a birefringence of at least about 0.05; and
    a second phase, disposed within said first phase, whose index of refraction differs from said first phase by greater than about 0.05 along a first axis;
    wherein diffuse reflectivity of said first and second phases taken together along at least one axis for at least one polarization of electromagnetic radiation is at least about 30%;
  post-forming said optical body into a diffusely reflective article, wherein a selected area of said optical body undergoes permanent deformation, and further wherein the index of refraction of said second phase differs from the index of refraction of said first phase by less than about 0.05 along a second axis orthogonal to said first axis in said selected area of said optical body after post-forming, and further wherein said selected area of said optical body comprises only a portion of said optical body.

20. A method according to claim 19, wherein, before post-forming, the index of refraction of said second phase differs from the index of refraction of said first phase by more than about 0.01 along said second axis in said selected area of said optical body.

21. A method according to claim 19, wherein, after post-forming, the index of refraction of said second phase differs from the index of refraction of said first phase by less than about 0.03 along said second axis in said selected area.

22. A method according to claim 19, wherein, before post-forming, the index of refraction of said second phase differs from the index of refraction of said first phase by more than about 0.07 along said first axis.

23. A method according to claim 19, wherein the diffuse reflectivity of said first and second phases taken together along at least one axis for at least one polarization of electromagnetic radiation is at least about 50% in said selected area of said optical body.

24. A method according to claim 19, wherein said diffusely reflective article comprises a self-supporting three dimensional shape.

25. A method of manufacturing a diffusely reflective article, said method comprising:
  providing an optical body having a generally sheet-like configuration, said optical body comprising:
    a first phase having a birefringence of at least about 0.05; and
    a second phase, disposed within said first phase, whose index of refraction differs from said first phase by greater than about 0.05 along a first axis;
    wherein diffuse reflectivity of said first and second phases taken together along at least one axis for at least one polarization of electromagnetic radiation is at least about 10%;
  post-forming said optical body into a diffusely reflective article, wherein a selected area of said optical body undergoes permanent deformation, and further wherein said selected area of said optical body comprises only a portion of said optical body; and
  annealing the optical body after post-forming, wherein the index of refraction of said second phase differs from the index of refraction of said first phase by less than about 0.05 along a second axis orthogonal to said first axis in said selected area of said optical body after annealing.

26. A method of manufacturing a diffusely reflective article, said method comprising:
  providing an optical body having a generally sheet-like configuration, said optical body comprising:
    a first phase having a birefringence of at least about 0.05;
    a second phase, disposed within said first phase, whose index of refraction differs from said first phase by greater than about 0.05 along a first axis; and
    a dichroic dye;
    wherein diffuse reflectivity of said first and second phases taken together along at least one axis for at least one polarization of electromagnetic radiation is at least about 10%;
  post-forming said optical body into a diffusely reflective article, wherein a selected area of said optical body undergoes permanent deformation, and further wherein said selected area of said optical body comprises only a portion of said optical body.

27. A method according to claim 26, wherein said second phase has an index of refraction that differs from the index of refraction of said first phase by less than about 0.05 along a second axis orthogonal to said first axis.

28. A method according to claim 26, wherein said dichroic dye is located within said second phase.

29. A diffusely reflective article comprising an optical body including a first phase having a birefringence of at least about 0.05 and a second phase, disposed within said first phase, whose index of refraction differs from said first phase by greater than about 0.05 along a first axis and by less than about 0.05 along a second axis orthogonal to said first axis, wherein diffuse reflectivity of said first and second phases taken together along at least one axis for at least one polarization of electromagnetic radiation is at least about 30%; wherein at least one surface of said optical body comprises a self-supporting three-dimensional shape.

30. An article according to claim 29, wherein said optical body comprises a self-supporting three-dimensional shape.

31. An article according to claim 29, wherein said first and second phases taken together exhibit diffuse reflectivity along said at least one axis of at least about 50% for both polarizations of electromagnetic radiation.

32. An article according to claim 29, wherein said optical body exhibits a total reflectivity of greater than about 50% for a first polarization of electromagnetic radiation and a total transmission of greater than about 50% for a second polarization of electromagnetic radiation orthogonal to said first polarization.

33. A diffusely reflective article comprising an optical body including a first phase having a birefringence of at least about 0.05 and a second phase, disposed within said first phase, whose index of refraction differs from said first phase by greater than about 0.05 along a first axis and by less than about 0.05 along a second axis orthogonal to said first axis, wherein diffuse reflectivity of said first and second phases taken together along at least one axis for at least one polarization of electromagnetic radiation is at least about 30%; wherein the thickness of said optical body as measured along a third axis orthogonal to said first and second axes varies over said optical body.

34. An article according to claim 33, wherein the thickness variations are non-uniform over said optical body.

35. An article according to claim 33, wherein said optical body has maximum thickness $t_o$ and a minimum thickness $t_f$, and further wherein the ratio $t_o:t_f$ is at least about 1.1:1 or greater.

36. An article according to claim 35, wherein said ratio is at least about 1.5:1 or greater.

* * * * *